US 8,379,567 B2

(12) United States Patent
Cho et al.

(10) Patent No.: US 8,379,567 B2
(45) Date of Patent: Feb. 19, 2013

(54) METHOD OF TRANSMITTING/UPDATING SYSTEM INFORMATION

(75) Inventors: Hee Jeong Cho, Anyang-si (KR); Ki Seon Ryu, Anyang-si (KR); Young Soo Yuk, Anyang-si (KR)

(73) Assignee: LG Electronics Inc., Seoul (KR)

( * ) Notice: Subject to any disclaimer, the term of this patent is extended or adjusted under 35 U.S.C. 154(b) by 1070 days.

(21) Appl. No.: 12/354,362

(22) Filed: Jan. 15, 2009

(65) Prior Publication Data
US 2009/0197599 A1 Aug. 6, 2009

Related U.S. Application Data

(60) Provisional application No. 60/021,311, filed on Jan. 15, 2008, provisional application No. 61/121,149, filed on Dec. 9, 2008, provisional application No. 61/121,194, filed on Dec. 10, 2008, provisional application No. 61/138,099, filed on Dec. 16, 2008.

(30) Foreign Application Priority Data

Feb. 15, 2008 (KR) .................. 10-2008-0013947
Apr. 21, 2008 (KR) .................. 10-2008-0036605
Jan. 12, 2009 (KR) .................. 10-2009-0002270

(51) Int. Cl.
*H04J 3/08* (2006.01)
(52) U.S. Cl. ........ 370/326; 370/329; 370/331; 455/450; 455/452.2; 455/502; 455/68
(58) Field of Classification Search .......... 370/329–331, 370/342–350, 315; 455/450–452.2, 436–442, 455/502
See application file for complete search history.

(56) References Cited

U.S. PATENT DOCUMENTS

| 6,018,519 | A | 1/2000 | Ginzboorg | |
| 7,346,349 | B2 * | 3/2008 | Numminen et al. | 455/434 |
| 7,620,017 | B2 * | 11/2009 | Sayeedi et al. | 370/331 |
| 7,912,425 | B2 * | 3/2011 | Ihm et al. | 455/39 |
| 8,107,413 | B2 * | 1/2012 | Lee et al. | 370/326 |
| 8,280,380 | B2 * | 10/2012 | Kim et al. | 455/439 |
| 2009/0010219 | A1 | 1/2009 | Lee et al. | |
| 2011/0032899 | A1 * | 2/2011 | Park et al. | 370/329 |
| 2011/0051668 | A1 * | 3/2011 | Lee et al. | 370/328 |
| 2011/0058527 | A1 * | 3/2011 | Choi et al. | 370/329 |

FOREIGN PATENT DOCUMENTS

| JP | 8-37678 A | 2/1996 |
| JP | 2003-249891 A | 9/2003 |
| JP | 2004-349971 A | 12/2004 |
| JP | 2006-115426 A | 4/2006 |
| JP | 2007-116639 A | 5/2007 |
| JP | 2009-524976 A | 7/2009 |
| KR | 10-2005-0083464 A | 8/2005 |
| KR | 10-2006-0040243 A | 5/2006 |
| KR | 10-0594116 B1 | 6/2006 |
| KR | 10-0606026 B1 | 7/2006 |
| KR | 10-0885442 B1 | 2/2009 |
| WO | WO 2006104353 A2 * | 10/2006 |
| WO | WO 2007/091795 A1 | 8/2007 |

* cited by examiner

*Primary Examiner* — Sharad Rampuria
(74) *Attorney, Agent, or Firm* — Birch, Stewart, Kolasch & Birch, LLP

(57) ABSTRACT

A method of transmitting/updating system informations is disclosed. The present invention includes transmitting channel descriptor transmission control information including an index of the system information classified into a plurality of groups to a terminal at a start timing point of an arbitrary control interval and transmitting the system information of a corresponding group to the terminal at a transmission timing point according to the index in the control interval. According to the above embodiments of the present invention, it is able to non-periodically perform scheduling on system informations classified by a base station. It is able to decrease an update time of system information as well as a time taken for network entry and initialization of terminals. And, it is able to obtain distributed effect of an initial ranging attempt in aspect of system.

14 Claims, 22 Drawing Sheets

BACKGROUND ART

BACKGROUND ART

BACKGROUND ART

METHOD OF TRANSMITTING/UPDATING SYSTEM INFORMATION

CROSS-REFERENCE TO RELATED APPLICATIONS

This application claims the benefit of the U.S. Provisional Application Nos. 61/021,311, 61/121,149, 61/121,194 and 61/138,099 filed on Jan. 15, 2008, Dec. 9, 2008, Dec. 10, 2008 and Dec. 16, 2008, which are hereby incorporated by reference as if fully set forth herein.

This application claims the benefit of the Korean Patent Application Nos. 10-2008-0013947, 10-2008-0036605 and 10-2009-0002270, filed on Feb. 15, 2008, Apr. 21, 2008 and Jan. 12, 2009, respectively, which are hereby incorporated by reference as if fully set forth herein.

BACKGROUND OF THE INVENTION

1. Field of the Invention

The present invention relates to network entry and initialization of terminal, and more particularly, to a method of transmitting/updating system informations. Although the present invention is suitable for a wide scope of applications, it is particularly suitable for reducing a time taken to update system informations of terminals.

2. Discussion of the Related Art

Generally, the process for network entry and initialization of terminals in a broadband wireless access system is performed by the terminal each time the terminal turns on its power, misses its cell, or moves away into a new cell.

FIG. 1 is a schematic flowchart of a network entry and initialization process.

Referring to FIG. 1, a terminal (subscriber station: SS) performs the scan for a downlink (DL) channel and then establishes synchronization with a base station (BS) [S110]. This step is performed using a preamble, downlink MAP (DL-MAP) message, DCD message and the like, which are received from the base station.

After completion of the synchronization establishment with the base station, uplink parameters (Tx parameters) are obtained from UCD message [S120].

Subsequently, the terminal performs ranging and also performs automatic adjustments [S130].

The terminal then negotiates basic capabilities with the base station [S140].

After completion of the basic capability negotiation, the base station authorizes the terminal (subscriber station: SS) and then performs key exchange [S150]. This step S150 can be performed only if both of the base station and the terminal support an authorizing policy. So, this step S150 is not mandatory.

Subsequently, the terminal performs a registration procedure on the base station [S160].

Thereafter, such a step as a step S170 of establishing IP connectivity, a step S180 of establishing time of data, a step S190 of transferring operational parameters and the like can be performed according to a presence or non-presence of the supports by the terminal and base station and according to a selection made by the terminal.

FIG. 2 is a flowchart for a downlink synchronization process of a terminal.

FIG. 2 shows a detailed flow of the downlink synchronization step S110 with a base station, which is the first step of the network entry and initialization process.

Referring to FIG. 2, a terminal searches a random channel (e.g., $i^{th}$ channel) for a Preamble [S210]. And the terminal then starts to detect a preamble until finding a valid downlink signal [S220].

If the preamble is detected [S220], the terminal matches physical synchronizations of frequency, time and the like using the detected preamble. If the terminal receives a DL-MAP message [S230], timers T1 and T12 are set to start [S240, S250] and MAC synchronization is established [S260].

Meanwhile, if the terminal fails to detect the preamble or fails to receive the DL-MAP message, the terminal moves away into a next channel [S235] and then repeats the preamble detecting step S210.

FIG. 3 is a flowchart of a process for maintaining the downlink synchronization shown in FIG. 2.

Referring to FIG. 3, if a terminal successfully receives DL-MAP and DCD messages within the Lost DL-MAP Interval and T1, respectively [S310], the terminal maintains downlink synchronization and resets a corresponding timer [S320]. In this case, 'T1' can be represented as Formula 1.

$$T1 = 5 \times DCD \text{ interval maximum value} \quad \text{[Formula 1]}$$

In Formula 1, the DCD interval maximum value is defined as 10 seconds. If the terminal fails to receive any one of the corresponding messages until the timer associated with each of the messages expires, the terminal starts a search for a new downlink signal [S330].

FIG. 4 is a flowchart of a process for a terminal to obtain uplink associated parameters.

FIG. 4 shows a detailed flow of the second step in the network entry and initialization process, i.e., the step S120 of receiving the uplink associated parameters as shown in FIG. 1.

Referring to FIG. 4, a terminal preferentially establishes downlink synchronization with a base station [S410] and then waits for UCD message to obtain information relevant to uplink.

If the UCD message is not received until a timer T12 expires, or if the corresponding received information is not suitable for the terminal, the terminal attempts to perform a first step of the network entry and initialization, i.e., a downlink channel searching step S480 again. In this case, the timer T12 can be represented as Formula 2.

$$T12 = 5 \times UCD \text{ interval maximum value} \quad \text{[Formula 2]}$$

In Formula 1, the UCD interval maximum value is defined as 10 seconds.

If the terminal receives the UCD message before the timer T12 expires [S420], the terminal waits for UL-MAP message for a selected channel. In this case, if an uplink channel is available [S430], the terminal obtains uplink parameters [S440], resets the timer T12 [S450], and then maintains uplink information [S470].

FIG. 5 is a flowchart of a process for maintaining the uplink associated parameters shown in FIG. 4.

Referring to FIG. 5, if a terminal successfully receives UL-MAP and UCD messages within given times, i.e., the Lost UL-MAP Interval and T12, respectively [S510], the terminal maintains valid uplink information and resets a corresponding timer [S520].

Meanwhile, if the terminal fails to receive any one of the corresponding messages until the timer related to each of the messages expires, the terminal determines that the uplink relevant information is not valid and then deletes uplink channel parameters [S530].

Subsequently, the terminal starts a search for a new downlink signal [S540].

FIG. 6 is a signal flowchart of a process for network entry and initialization according to a related art.

In particular, FIG. 6 shows the flow of messages generated in the course of performing steps before a terminal performs ranging. In this case, assume that DL-MAP and UL-MAP are transmitted every frame by setting a frame continuance interval to 20 ms. And, assume that each of the DCD and UCD transmission intervals is set to 10 s which is the maximum value defined in the related art.

Referring to FIG. 6, a base station transmits a preamble, DL-MAP and UL-MAP every 20 ms [S601, S602]. After a power of a terminal has been turned on [S603], the terminal is unable to recognize other messages except the preamble despite receiving the messages [S604].

The terminal is not able to enter a synchronized status [S606] until receiving the preamble and the DL-MAP [S605]. The terminal in the synchronized status then waits for a DCD message transmitted from the base station, even when a UCD message is received [S607]. The terminal receives the DCD message [S608], obtains parameter associated with downlink [S609], and then waits for a UCD message transmitted from the base station.

The terminal receives the UCD message [S610], obtains parameters associated with uplink, and then waits for information of a resource allocated to the initial ranging [S612]. Once the terminal obtains such resource information via the UL-MAP and the like [S613, S614], the terminal transmits CDMA code according to an initial ranging performing procedure [S615].

The conventional terminal has to sequentially read the preamble, the DL-MAP, the DCD, the UCD and the UL-MAP to perform the ranging. Considering the fact that the maximum transmission interval of each of the DCD and UCD is 10 s, this scheme may be inefficient in aspect of the time taken to perform the network entry and initialization process of terminals.

FIG. 7A is a diagram of a UCD updating process according to a related art.

In FIG. 7A, assume that UL-MAP is transmitted every frame by setting a frame continuance interval to 20 ms. And, assume that a UCD transmission interval is set to a maximum value 10 s that is defined in 'Chapter 10, Global values of 802.16 Rev2'. And, a terminal has already received UCD of which configuration change count is 'i'.

Referring to FIG. 7A, a base station transmits UL-MAP, of which UCD count is 'i', every 20 ms [S701, S702]. The base station retransmits a UCD message, of which configuration change count is 'i', at a timing point for transmitting a UCD message [S703].

A terminal receives this message, decodes the received message, and then compares the configuration change count of the newly received UCD to that of the UCD already given to the terminal. If the configuration change counts are equal to each other, the terminal ignores system information within the newly received message [S704].

The base station keeps transmitting the UL-MAP, of which UCD count is 'i', every 20 ms [S705]. If the system information is changed [S706], the base station transmits a configuration change count 'i+1' and a changed UCD message at a corresponding transmission timing point [S707].

The terminal receives this message and the like, decodes the received message, and then compares the configuration change count of the newly received UCD to that of the UCD already given to the terminal. If the configuration change counts differ from each other, the terminal decodes and stores system information included in the newly received message [S708].

Even when UCD count is changed, the changed system information according to the changed UCD count may be applied in the system after a certain time. That is, the base station may keep transmitting the UL-MAP, of which UCD count is 'i', every 20 ms [S709, S710]. The base station retransmits the formerly transmitted UCD message at a corresponding transmission timing point and starts a UCD transition interval timer [S711]. If this timer expires, the base station transmits a UL-MAP of which UCD count is 'i+1' [S712].

The terminal receives this message, deletes previous UCD system information, and then applies new UCD system information [S713].

As mentioned in the above description, the base station transmits the system information carried on a single message every long interval. According to this scheme, each terminal needs to decode a message each time to recognize a presence or non-presence of update of system information. And, the terminal has to store and update the system information unnecessary to be updated. Moreover, a time taken for the terminal to apply the changed system information may be increased.

SUMMARY OF THE INVENTION

Accordingly, the present invention is directed to a method of transmitting/updating system informations that substantially obviates ones or more problems due to limitations and disadvantages of the related art.

An object of the present invention is to provide a method of transmitting system informations, by which a time taken to update system informations of a terminal can be decreased in a manner of classifying the system informations according to specific references and then broadcasting them with different period patterns, respectively without transmitting the system informations collectively from a base station to the terminal in a wireless access system.

Another object of the present invention is to provide a method of updating system informations, by which a terminal is able to update a group having changed system information belong thereto and by which frequently changed system information can be quickly applied, in a manner that the terminal receives such control information on system information groups classified by the base station as a transmission timing point, a transmission group, a configuration change count and the like in advance.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method for transmitting system information in a wireless access system, the method comprises: transmitting channel descriptor transmission control information including group type information of the system information grouped into a plurality of group, a system configuration change count and toggle bits indicating change for each of the plurality of groups to a terminal at a start timing point of a control interval; and transmitting the system information corresponding to the group type information, the system configuration change count and the toggle bits in the control interval.

Here, the system configuration change count may be commonly applied to all of the plurality of group, or be individually applied to each of the plurality of group.

Preferably, the toggle bits may indicate whether the system information of each group as a form of bitmap.

Preferably, the control interval may be a superframe, and the channel descriptor transmission control information may be transmitted through a PBCH (Primary Broadcast Channel).

Preferably, the system information corresponding to the group type information may be transmitted through SBCH (Secondary Broadcast Channel).

And, the method may further comprise: transmitting additional information which can not be transmitted through the PBCH and the SBCH, and transmission control information for the additional information may be transmitted through the SBCH.

In another aspect of the present invention, a method for receiving system information by a mobile terminal in a communication system, the method comprises: receiving channel descriptor transmission control information including group type information of the system information grouped into a plurality of group, a system configuration change count and toggle bits indicating change for each of the plurality of groups from a base station at a start timing point of a control interval; and selectively receiving the system information based on the group type information, the system configuration change count and the toggle bits in the control interval.

Here, the system configuration change count may be commonly applied to all of the plurality of group, or may be individually applied to each of the plurality of group.

Preferably, the toggle bits may indicate whether the system information of each group as a form of bitmap.

Preferably, the control interval may be a superframe, and the channel descriptor transmission control information may be transmitted through a PBCH (Primary Broadcast Channel).

Preferably, the system information corresponding to the group type information may be transmitted through SBCH (Secondary Broadcast Channel).

Preferably, the method further comprises: receiving additional information which can not be transmitted through the PBCH and the SBCH using information acquired by receiving the SBCH.

According to the above embodiments of the present invention, it is able to non-periodically perform scheduling on system informations classified by a base station. It is able to decrease an update time of system information as well as a time taken for network entry and initialization of terminals. And, it is able to obtain distributed effect of an initial ranging attempt in aspect of system.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
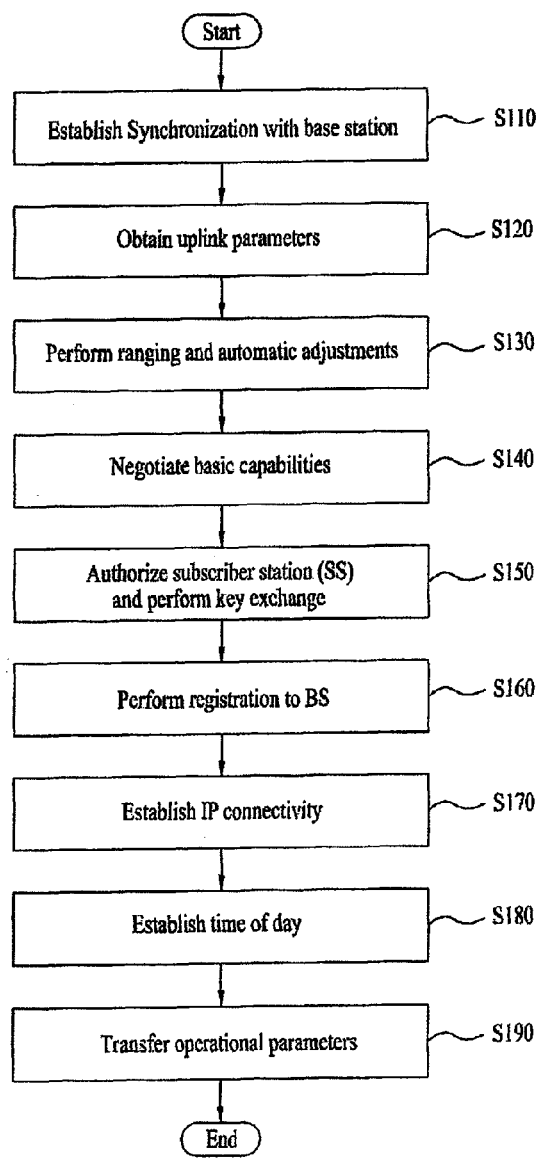
FIG. 1 is a schematic flowchart of a network entry and initialization process.
Figure 2:
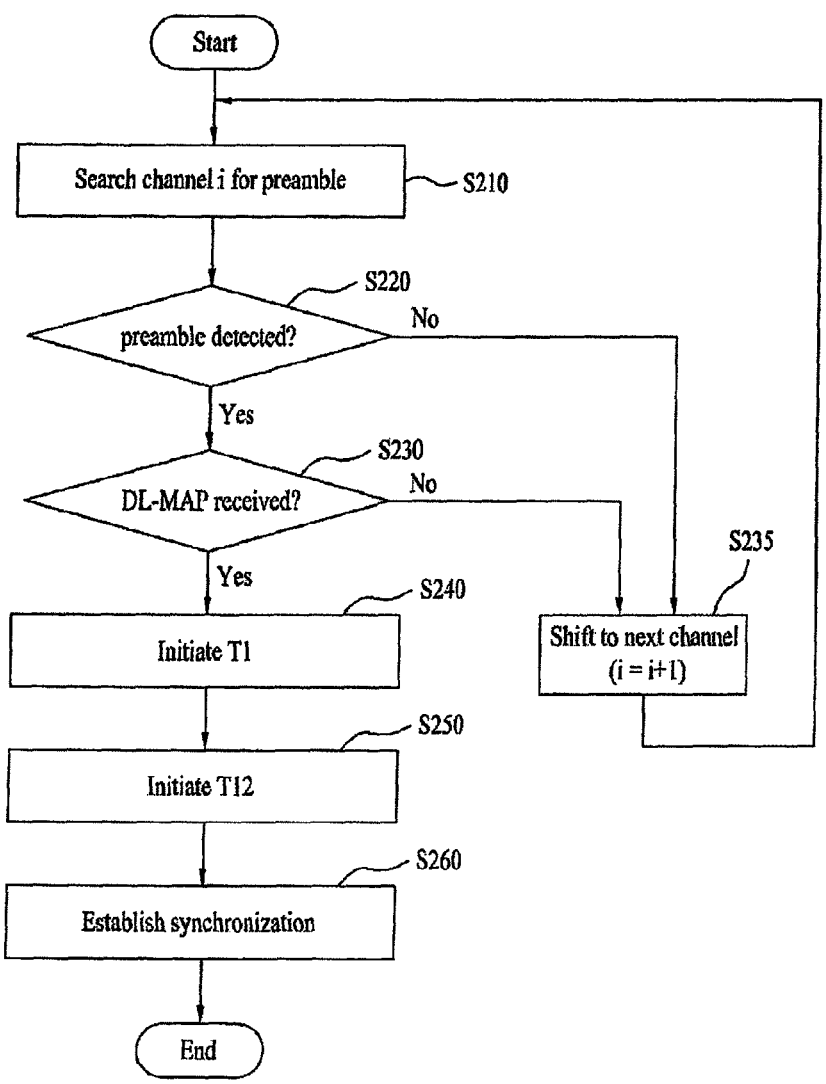
FIG. 2 is a flowchart for a downlink synchronization process of a terminal.
Figure 3:
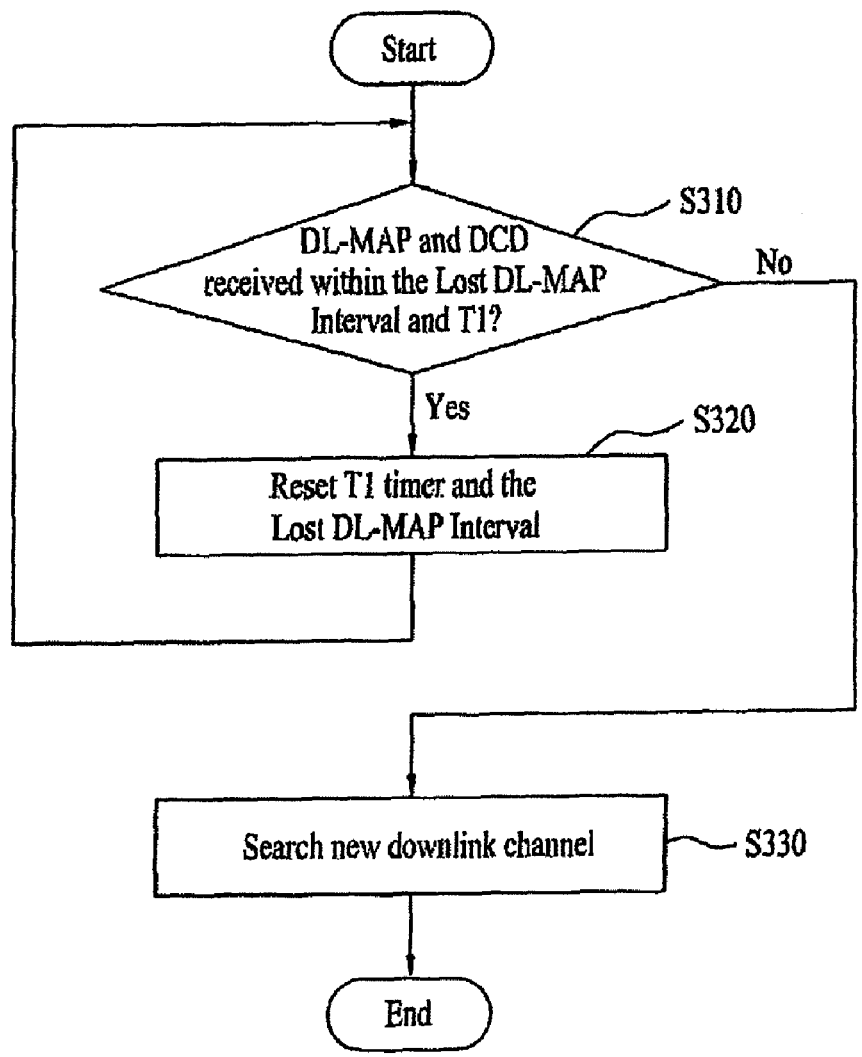
FIG. 3 is a flowchart of a process for maintaining the downlink synchronization shown in FIG. 2.
Figure 4:
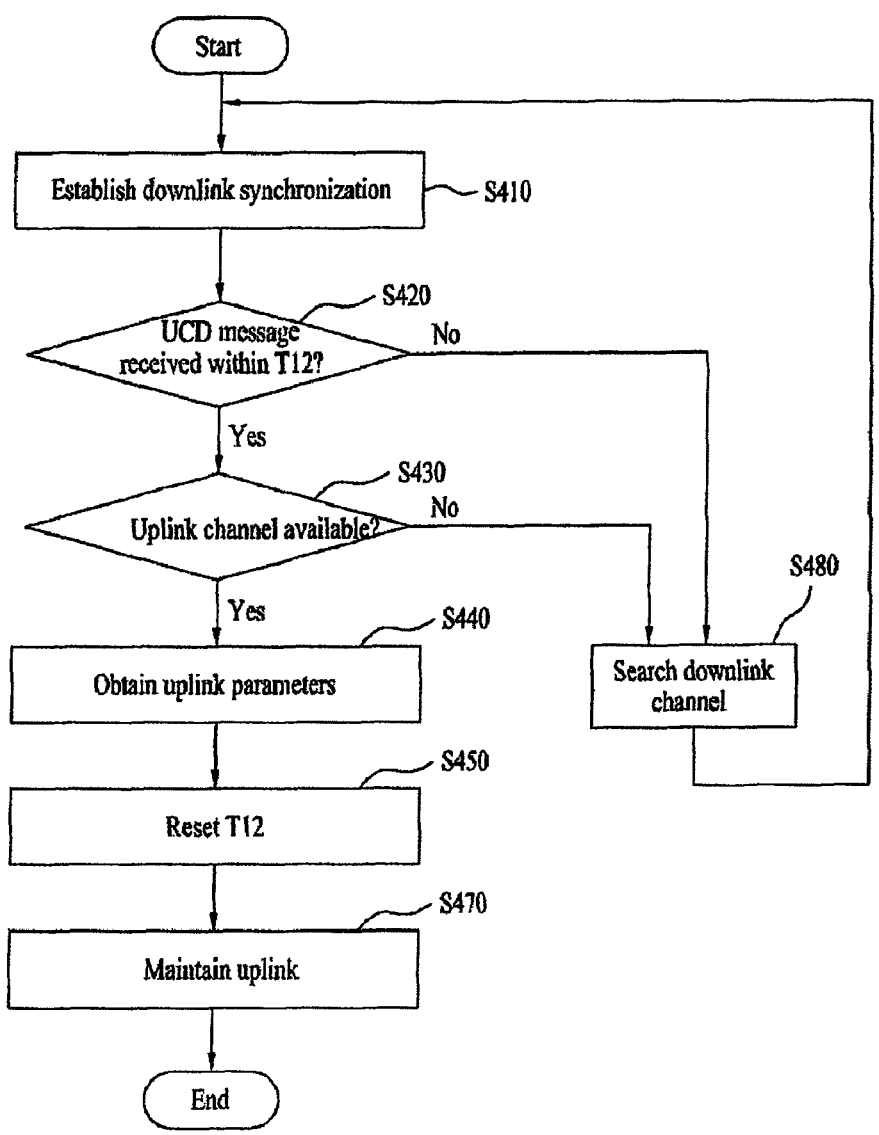
FIG. 4 is a flowchart of a process for a terminal to obtain uplink associated parameters.
Figure 5:
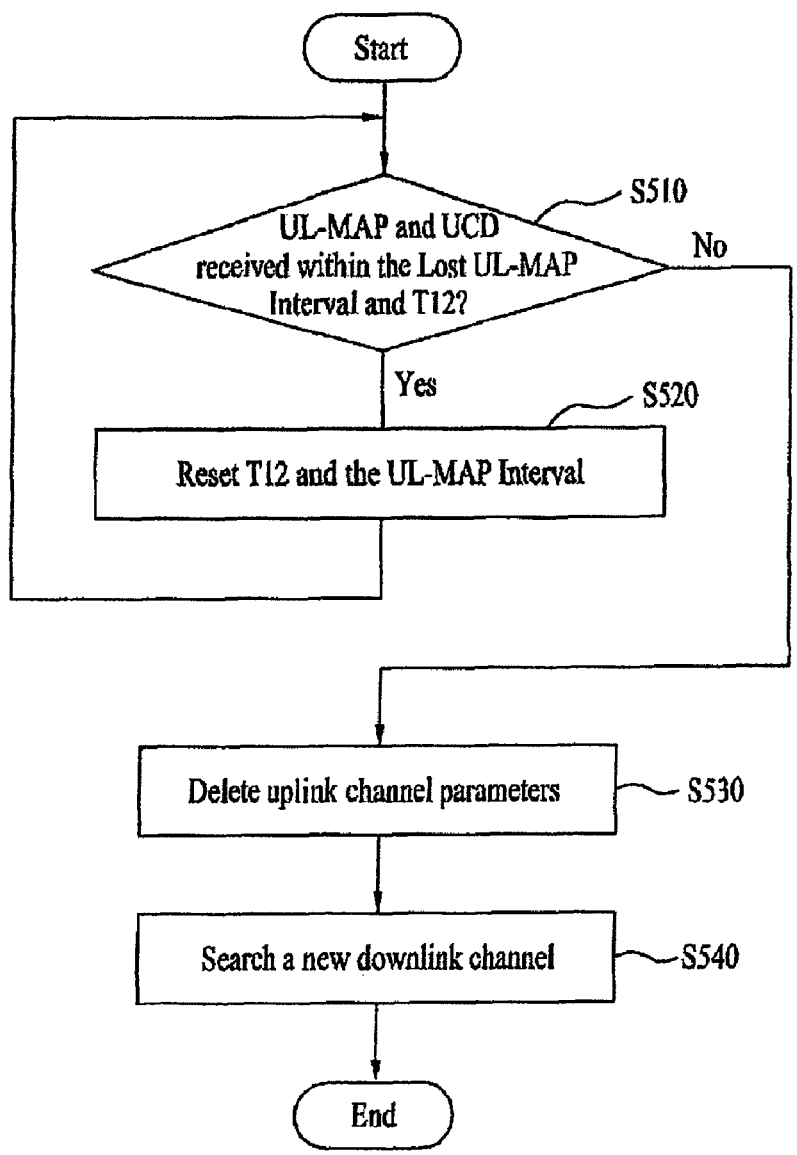
FIG. 5 is a flowchart of a process for maintaining the uplink associated parameters shown in FIG. 4.
Figure 6:
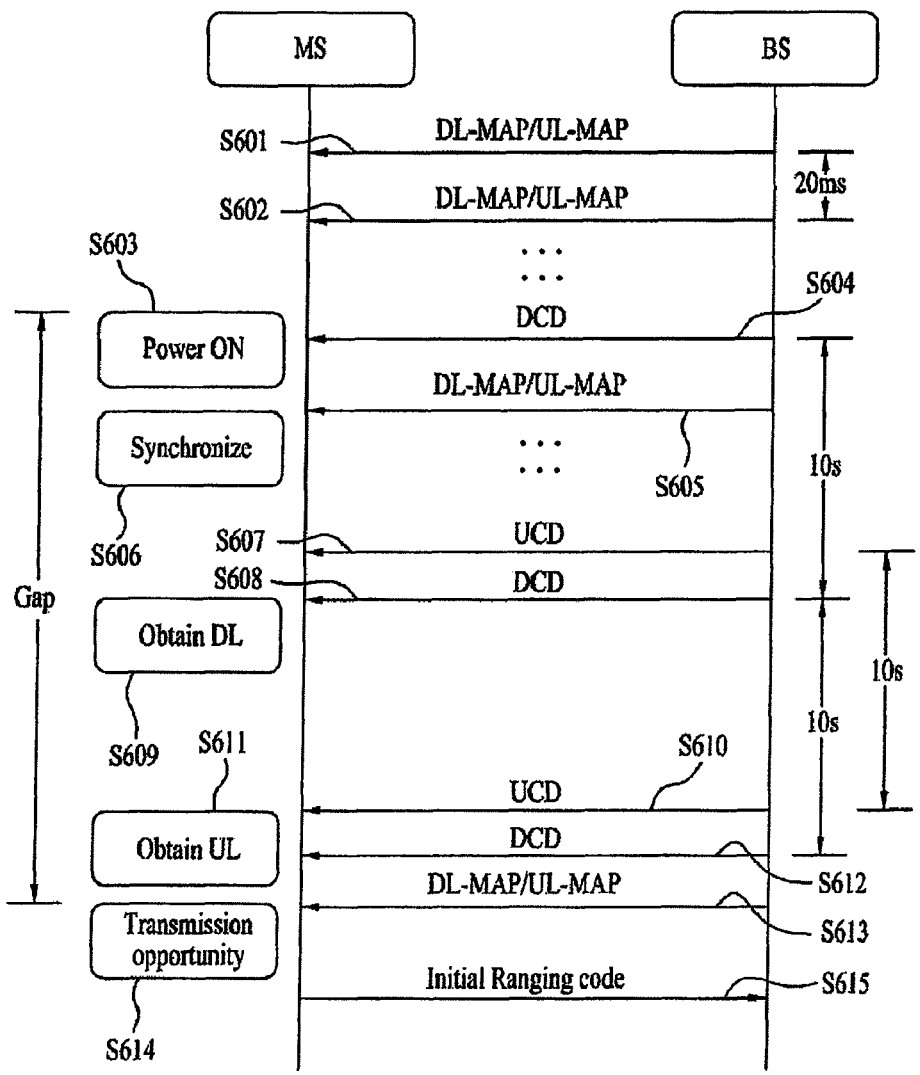
FIG. 6 is a signal flowchart of a process for network entry and initialization according to a related art.

Reference will now be made in detail to the preferred embodiments of the present invention, examples of which are illustrated in the accompanying drawings. Wherever possible, the same reference numbers will be used throughout the drawings to refer to the same or like parts.

First of all, embodiments of the present invention include a method of classifying system informations existing within DCD or UCD message according to a specific reference and broadcasting the classified informations.

As an example, base station is able to classify system informations within DCD or UCD into high repetition group (hereinafter abbreviated 'HRG', middle repetition group (hereinafter abbreviated 'MRG'), low repetition group (hereinafter abbreviated 'LRG') and the like by considering a frequency count for transmission, characteristics of corresponding information and the like. In some case, system information conventionally within DL-MAP and/or UL-MAP messages may be grouped together with the system information conventionally within DCD and/or UCD message.

For instance, information which belongs to HRG among DCD system informations (hereinafter "$HRG_{DCD}$") may include TTG, RTG, EIRxPIR,max and the like and partial downlink burst profile. Information which belongs to HRG among UCD system informations (hereinafter "$HRG_{UCD}$") may include such initial ranging information required for performing initial ranging as initial ranging codes, start of ranging codes group, initial_ranging_back_off_start and the like. And, the information which belongs to $HRG_{UCD}$ can include such transmission power relevant information as MS-specific up power offset adjustment step, MS-specific down power offset adjustment step, minimum level of power offset adjustment and the like and partial uplink burst profile.

Tables 1-3 below are examples of downlink system information which may be included in HRG, MRG and LRG, respectively.

TABLE 1

| Information parameter | Value | Usage |
| --- | --- | --- |
| BS EIRP | Signed in units of 1 dBM. | Initial Ranging & Power Control |
| TTG | TTG (in PSs). Used on TDD systems only. | common infor. |
| EIRxPIR, max | Initial ranging maximum equivalent isotropic received power at BS. | Initial Ranging & Power Control |
| MAC version | If backward-compatibility is not supported, SS disables any attempt for UL transmission to BS. | common infor. |
| Default RSSI and CINR averaging parameter | Default averaging parameter for physical CINR measurements | CINR measurements |
| HARQ ACK delay for UL burst | frame offset | HARQ |
| Maximum retransmission | Maximum number of retransmission in DL HARQ | HARQ |
| FEC Code type and modulation type | Sub-set of code type and modulation type of each group | |

TABLE 2

| Information parameter | Value | Usage |
| --- | --- | --- |
| FEC Code type and modulation type | Sub-set of code type and modulation type of each group | |

TABLE 3

| Information parameter | Value | Usage |
| --- | --- | --- |
| RTG | RTG (in PSs). Used on TDD systems only | common infor. |
| BS ID | Base station identifier. | Handover |
| DL AMC allocated physical bands bitmap | A bitmap describing the physical bands allocated to the segment in the DL when allocating AMC subchannels | DL Resource |
| HO type support | Bit 0: HO Bit 1: MDHO Bit 2: FBSS HO Bit 3-7: Reserved | Handover |
| H_Add Threshold | Threshold used by the MS to add a neighbor BS to the diversity set | Handover |
| H_Delete Threshold | Threshold used by the MS to drop a BS from the diversity set. | Handover |
| ASR Slot Length (M) and Switching Period (L) | Bits 0-3: M, in units of frames. Bits 4-7: L, in units of ASR slots. | Handover |
| Paging Group ID | One or more logical affiliation grouping of BS | Paging (Idle) |
| TUSC1 permutation active subchannels bitmap | This is a bitmap describing the subchannels allocated to the segment in the DL, when using the TUSC1 permutation | DL Resource |
| TUSC2 permutation active subchannels bitmap | This is a bitmap describing the subchannels allocated to the segment in the DL, when using the TUSC2 permutation | DL Resource |
| Hysteresis margin | Hysteresis margin is used by the MS to include a neighbor BS to a list of possible target BSs. | Handover |
| Time-to-Trigger duration | Time-to-trigger duration is the time duration for MS decides to select a neighbor BS as a possible target BS. | Handover |
| Trigger | The Trigger is a compound TLV value that indicates trigger metrics | Handover |
| MBS zone identifier list | This parameter shall include all MBS zone identifiers | MBS |
| Default HO RSSI and CINR averaging parameter | | Handover |
| BS Restart Count | for the purpose of forcing all MSs to perform the Network Entry due to some problem at the BS or an operator's purpose. | common infor. |
| FEC Code type and modulation type | Sub-set of code type and modulation type of each group | |

Next, tables 4-6 below are examples of uplink system information which may be included in HRG, MRG and LRG, respectively.

TABLE 4

| Information parameter | Value | Usage |
|---|---|---|
| Contention-based reservation timeout | Number of UL-MAPs to receive before contention-based reservation is attempted again for the same connection. (Applied all the contention related to BR and the like) | Ranging |
| Initial ranging codes | Number of initial ranging CDMA codes. Possible values are 0-255. | Initial Ranging |
| Start of ranging codes group | Indicates the starting number, S, of the group of codes used for this UL. | Ranging |
| Permutation base | Determines the UL_PermBase parameter for the subcarrier permutation to be used on this UL channel. UL_PermBase = 7 LSBs of Permutation base. | Ranging |
| UL allocated subchannels bitmap | This is a bitmap describing the physical subchannels allocated to the segment in the UL, when using the UL PUSC permutation. | UL Resource |
| Size of CQICH_ID field | | CINR measurements |
| Use CQICH indication flag | The indication flag is used by the MS to indicate to the BS its intention to transmit a feedback header or a BR header without the need to perform BR ranging. | UL Resource |
| MS-specific up power offset adjustment step | for open-loop power control | Power Control |
| MS-specific down power offset adjustment step | for open-loop power control | Power Control |
| Minimum level of power offset adjustment | for open-loop power control | Power Control |
| Maximum level of power offset adjustment | for open-loop power control | Power Control |
| Initial ranging interval | Number of frames between initial ranging interval allocation | Initial Ranging |
| Tx Power Report | SS may report its transmission power status using BR and UL Tx power report header (6.3.2.1.2.1.2), PHY channel report header (6.3.2.1.2.1.5) or UL Tx power report extended subheader (6.3.2.2.7.5). | Power Report |
| Initial_ranging_backoff_start | Initial backoff window size for initial ranging contention | Initial Ranging |
| Initial_ranging_backoff_end | Final backoff window size for initial ranging contention | Initial Ranging |
| Bandwidth_request_backoff_start | Initial backoff window size for contention BRs | Bandwidth Request |
| Bandwidth_request_backoff_end | Final backoff window size for contention BRs | Bandwidth Request |
| Relative Power Offset for UL Burst Containing MAC Management Message | Power offset for UL burst containing a MAC management message relative to the normal traffic burst (unsigned integer in 0.5 dB units). | Power Control |
| Fast Feedback Region | | CINR measurements |
| HARQ Ack Region | | HARQ |
| Ranging Region | | Ranging |
| Sounding Region | | Sounding |
| UL_initial_transmit_timing | | common infor |
| Frequency | UL center frequency (kHz). | Initial - FDD |
| HARQ ACK delay for DL burst | The HARQ-enabled SS that receives HARQ DL burst at i-th frame should transmit ACK signal through the half-subchannel in the HARQ region at (i + j)-th frame. | HARQ |
| Maximum retransmission | Maximum number of retransmission in UL HARQ | HARQ |
| Relative_Power_Offset_For_UL_HARQ_burst ucd burst profile | Offset for HARQ burst relative to non-HARQ burst Sub-set of code type and modulation type of each group | Power Control |

TABLE 5

| Information parameter | Value | Usage |
|---|---|---|
| HO_ranging_start | Initial backoff window size for MS performing initial ranging during HO process, expressed as a power of 2. Range: 0-15 (the highest order bits shall be unused and set to 0). | Handover Ranging |
| HO_ranging_end | Final backoff window size for MS performing initial ranging during HO process, expressed as a power of 2. Range: 0-15 (the highest order bits shall be unused and set to 0). | Handover Ranging |
| Periodic ranging codes | Number of periodic ranging CDMA codes. Possible values are 0-255. | Periodic Ranging |
| Bandwidth request codes | Number of BR codes. Possible values are 0-255. | Bandwidth Request |
| Periodic ranging backoff start | Initial backoff window size for periodic ranging contention, expressed as a power of 2. Range: 0-15 (the highest order bits shall be unused and set to 0). | Periodic Ranging |
| Periodic ranging backoff end | Final backoff window size for periodic ranging contention, expressed as a power of 2. Range: 0-15 (the highest order bits shall be unused and set to 0). | Periodic Ranging |
| Optional permutation UL Allocated subchannels bitmap | This is a bitmap describing the physical subchannels allocated to the segment in the UL, when using the UL optional PUSC permutation | UL Resource |
| Handover Ranging Codes | Number of HO ranging CDMA codes. Possible values are 0-255. | Handover Ranging |

TABLE 5-continued

| Information parameter | Value | Usage |
|---|---|---|
| UL PUSC Subchannel Rotation | Indicates the default setting of subchannel rotation in the UL frame. | UL Resource |
| ucd burst profile | Sub-set of code type and modulation type of each group | |

TABLE 6

| Information parameter | Value | Usage |
|---|---|---|
| Band AMC Allocation Threshold | Threshold of the maximum of the standard deviations of the individual bands CINR measurements over time to trigger mode transition from normal subchannel to band AMC. | CINR measurements & Transition |
| Band AMC Release Threshold | Threshold of the maximum of the standard deviations of the individual bands CINR measurements over time to trigger mode transition from band AMC to normal subchannel. | CINR measurements & Transition |
| Band AMC Allocation Timer | Minimum required number of frames to measure the average and standard deviation for the event of band AMC triggering. | CINR measurements & Transition |
| Band AMC Release Timer | Minimum required number of frames to measure the average and standard deviation for the event triggering from band AMC to normal subchannel. | CINR measurements & Transition |
| Band Status Reporting MAX Period | Maximum period between refreshing the band CINR measurement by the unsolicited REP-RSP. | CINR measurements & Transition |
| Band AMC Retry Timer | Frame unit. Backoff timer between consecutive mode transitions from normal subchannel to band AMC when the previous request is failed | CINR measurements & Transition |
| Safety Channel Allocation Threshold | Similar form as Band AMC transition, it is just safety channel | CINR measurements & Transition |
| Safety Channel Release Threshold | Similar form as Band AMC transition it is just safety channel | CINR measurements & Transition |
| Safety Channel Allocation Timer | Similar form as Band AMC transition, it is just safety channel | CINR measurements & Transition |
| Safety Channel Release Timer | Similar form as Band AMC transition, it is just safety channel | CINR measurements & Transition |
| Bin Status Reporting MAX Period | Similar form as Band AMC transition, it is just safety channel | CINR measurements & Transition |
| Safety Channel Retry Timer | Similar form as Band AMC transition, it is just safety channel | CINR measurements & Transition |
| CQICH Band AMCTransition Delay | | CINR measurements & Transition |
| UL AMC Allocated physical bands bitmap | A bitmap describing the physical bands allocated to the segment in the UL. When using the optional AMC permutation with regular MAPs | UL Resource |

TABLE 6-continued

| Information parameter | Value | Usage |
|---|---|---|
| Band AMC Entry Average CINR | Threshold of the average CINR of the whole bandwidth to trigger mode transition from normal subchannel to AMC | CINR measurements & Transition |
| UpperBoundAAS_PREAMBLE | required (C/N) value of the current transmission AAS UL preamble | AAS |
| LowerBoundAAS_PREAMBLE | required (C/N) value of the current transmission AAS UL preamble | AAS |
| Allow AAS Beam Select Messages | Boolean to indicate whether unsolicited AAS Beam Select messages | AAS |

The above tables 1-6 are only exemplary, and system information may be grouped differently from the above tables 1-6. And, some part of each table above may be omitted.

Meanwhile, the system information of DCD or UCD belonging to the middle repetition group (MRG) is transmitted using a resource preoccupied for the transmission of the high repetition group (HRG).

And, the system information of DCD or UCD belonging to the low repetition group (LRG) is transmitted using a resource preoccupied for the transmission of the high repetition group (HRG). In this case, it is able to set a transmission count of the low repetition group to '1' for a DCD or UCD transmission interval.

In case that system informations are classified into three groups HRG, MRG and LRG, it is preferable that a transmission count of each of the groups for DCD or UCD transmission interval meets the condition such as Formula 3.

$$\text{Count}_{HRG} > \text{Count}_{MRG} > \text{Count}_{LRG} \quad \text{[Formula 3]}$$

Finally, a transmission start point for transmitting system informations of each of the groups is determined according to the allocated transmission count.

As above examples, the system information may be grouped according to the frequency of the transmission. However, the present invention does not exclude any grouping criteria other than that according to the frequency of the transmission. Also, the number of group may not be restricted to 3.

The above-classified system information can be broadcasted using MAP message. In this case, as mentioned in the foregoing description, the group information includes informations on the result from classifying such system informations as control information for network entry and initialization of terminal, burst profile and the like into at least one or more groups.

In case that the system informations are classified into the three groups HRG, MRG and LRG, system information of DCD or UCD belonging to the high repetition group can be scheduled to be transmitted for each frame of which value calculated according to Formula 4 or Formula 5 is 0. In this case, DCD high repeat interval and UCD high repeat interval are defined as values of frame unit according to the frame continuance interval, respectively.

$$HRG_{DCD} = (\text{Frame Number}) \bmod (DCD \text{ High Repeat Interval}) \quad \text{[Formula 4]}$$

$$HRG_{UCD} = (\text{Frame Number}) \bmod (UCD \text{ High Repeat Interval}) \quad \text{[Formula 5]}$$

In the formulas 4 and 5, "mod" represent modulo operation.

In case that system informations are transmitted using MAP message, system information of DCD can be included in an extended-2 DIUC reserved region of downlink interval use code (DIUC) 14, i.e., 0x0F. And, this system information is included as information element in MAP. This is defined as downlink (DL) channel information element (IE) shown in Table 7.

TABLE 7

| Syntax | Size | notes |
|---|---|---|
| DL channel information IE { | — | — |
| Extended-2 DIUC | 4 | 0x0F |
| Length | 8 | |
| Reserved | 3 | |
| Encodings | variable | TLV |
| } | | |

In case that system informations are transmitted using MAP message, system information of UCD can be included in an extended-2 UIUC reserved region of uplink interval use code (UIUC) 11, i.e., 0x0D. And, this system information is included as information element in MAP. This is defined as uplink (UL) channel information element (IE) shown in Table 8.

TABLE 8

| Syntax | Size | notes |
|---|---|---|
| UL channel information IE { | — | — |
| Extended-2 UIUC | 4 | 0x0D |
| Length | 8 | |
| Reserved | 3 | |
| Encodings | variable | TLV |
| } | | |

A terminal, which fails to recognize the extended-2 DIUC or the extended-2 UIUC, ignores this information and just performs ranging after receiving DCD or UCD in a conventional manner. In particular, a base station is able to transmit DCD or UCD by a conventional scheme to secure compatibility with a conventional terminal.

Meanwhile, it is able to broadcast the above-classified system information using a downlink burst.

Figure 7A:
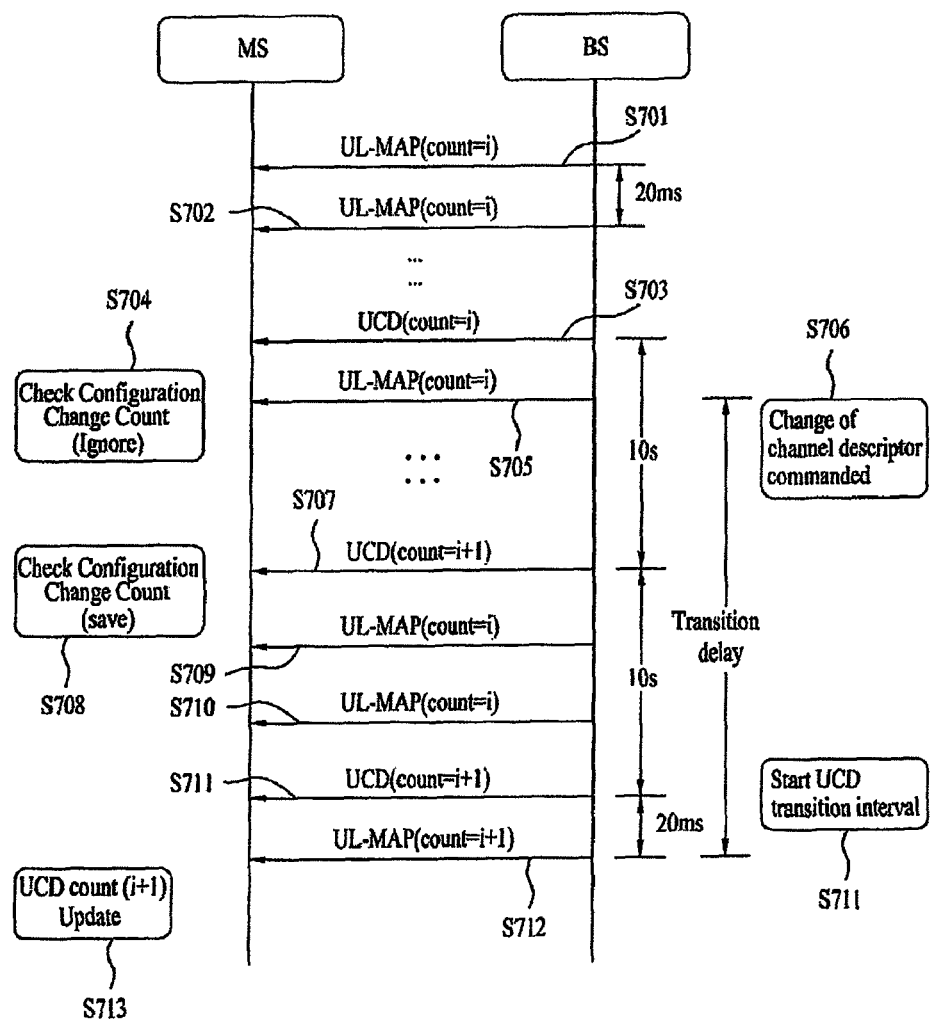
FIG. 7A is a diagram of a UCD updating process according to a related art.
Figure 7B:
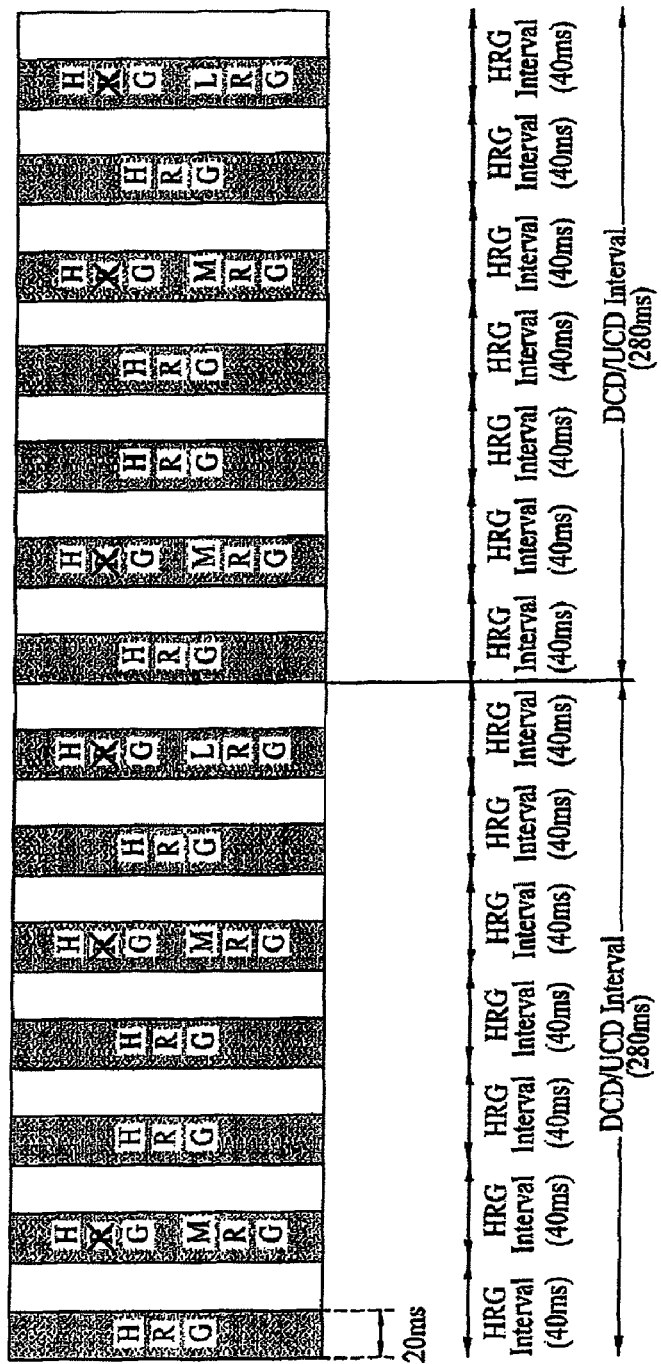
FIG. 7B is a diagram of an example for performing broadcast message scheduling.

FIG. 7B is a diagram of an example for performing broadcast message scheduling.

First of all, system information transmitted in a DCD or UCD transmission interval includes a set of system informations of all groups (that is, 1 HRG, 1 MRG and 1 LRG) and surplus system informations belonging to high repetition group (HRG) and middle repetition group (MRG). Hence, the procedure for maintaining uplink and downlink synchronization parameters associated with T1 and T2 used for the network entry and initialization process is performed in the same manner.

FIG. 7B shows an arrangement example of DCD or UCD system informations. In this case, assume that DL-MAP and UM-MAP are transmitted each frame by setting a frame continuance interval to 20 ms. Assume that DCD or UCD transmission interval is set to 280 ms. Assume that a transmission interval of high repetition group is set to 2 frames. And, assume that a transmission count of middle repetition group is set to 2.

Referring to FIG. 7B, system information belonging to a high repetition group can be transmitted every 2 frames. Yet, in order to transmit system information belonging to a middle repetition group twice in a DCD or UCD transmission interval and in order to transmit system information belonging to a low repetition group once in a DCD or UCD transmission interval, it is able to transmit system information belonging to a high repetition group four times.

Embodiments of the present invention provide a method of reducing a time taken for a terminal to update and apply system information.

For this, a base station transmits channel descriptor transmission control information on a transmission timing point for system informations classified into a plurality of groups, a transmitted group type and the like to a terminal. And, the base station is able to transmit information indicating a presence or non-presence of a change of transmitted system information and the like to the terminal via channel descriptor change information.

Figure 8:
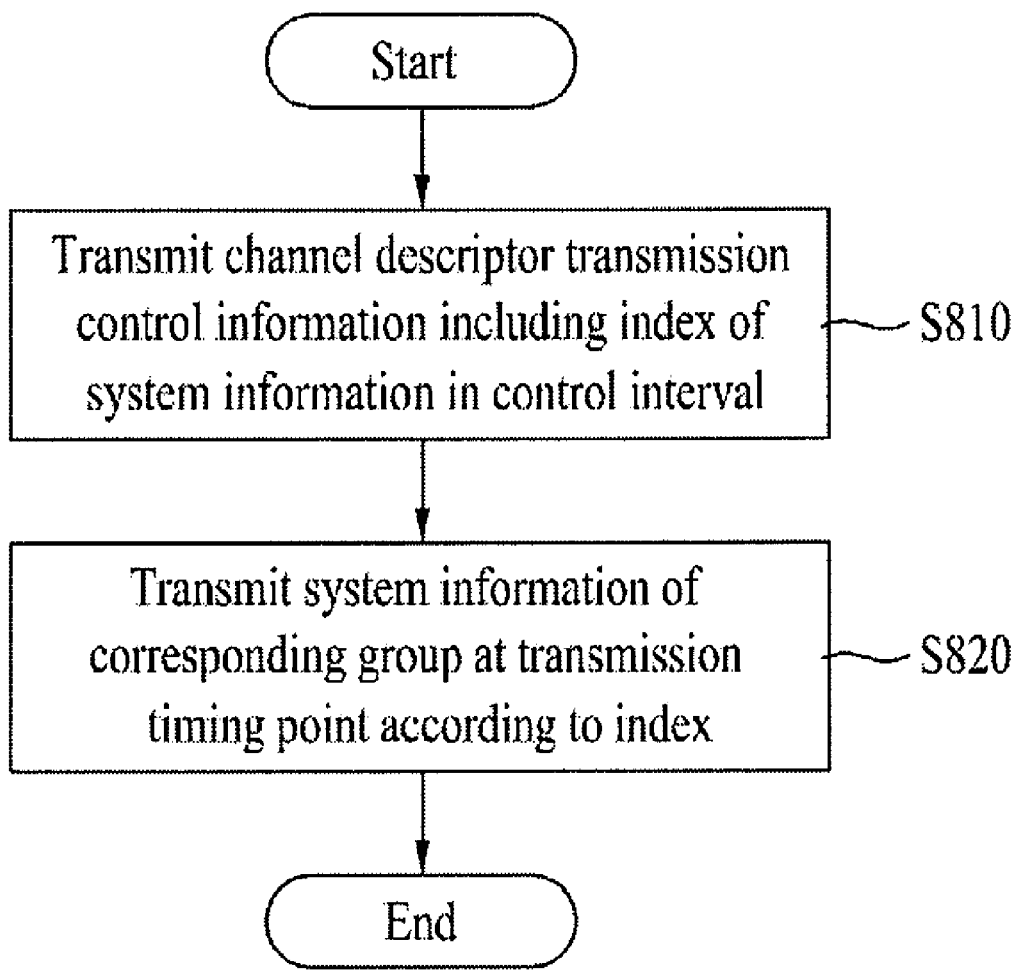
FIG. 8 is a flowchart for a system information transmitting method according to one embodiment of the present invention.

FIG. 8 is a flowchart for a system information transmitting method according to one embodiment of the present invention.

Referring to FIG. 8, channel descriptor transmission control information including an index of system information classified into a plurality of groups is transmitted to a terminal at a start timing point of an arbitrary control interval [S810]. The terminal uses a configuration change count contained in the channel descriptor transmission control information in determining whether to decode and store system information. In case that the configuration change count is determined in common to a group of all system informations, it is able to use a previous process and message associated with the configuration change count as it is.

Subsequently, system information of a corresponding group is transmitted to the terminal at a transmission timing point according to the index of the system information in a control interval [S820].

Moreover, a base station is able to set an update unit of the system information to a control interval unit instead of a MAP message unit. If so, it is able to reduce an overhead generated from transmitting DCD or UCD count every frame.

Meanwhile, in case that a configuration change count is set different per group of system information, when system information of a corresponding group is transmitted at a transmission timing point according to an index in a control interval, it is able to transmit a configuration change count of the corresponding group together with the system information.

Examples of channel descriptor transmission control information on system information groups (HRG, MRG, LRG) are shown in Table 9.

TABLE 9

| Syntax | Size | Notes |
|---|---|---|
| Channel_Descriptors_Transmission_Control_Format { | — | — |
| Group type | 3 | 000: no transmission 001: HRG 010: MRG 100: LRG |
| Configuration Change Count (Reduced Configuration Change Count) | 8 (4) | Reduced Configuration Change Count: 4 LSBs of Configuration Change Count |

TABLE 9-continued

| Syntax | Size | Notes |
|---|---|---|
| If (including HRG) { | | |
| Change bit | 1 | |
| index_type | 1 | 0: frame index<br>1: bitmap index |
| If (frame_index) { | | |
| Count | 2 | The number of HRG messages in control interval |
| For (i=0;i<Count;i++) { | | |
| Frame_index | variable | The number of bits of Frame index is determined by control interval Length. Value of (frame number MOD control interval) |
| } | | |
| } | | |
| } | | |
| Else { | | |
| Bitmap index | variable | The number of bits of Bitmap index is determined by control interval Length. The bit index corresponding to (frame number MOD control interval) in this Bitmap index field shall be set to 1. |
| } | | |
| } | | |
| If (including MRG) { | | |
| Change bit | 1 | |
| Frame_index | variable | The number of bits of Frame index is determined by control interval Length. Value of (frame number MOD control interval) |
| } | | |
| If (including LRG) { | | |
| Change bit | 1 | |
| Frame_index | variable | The number of bits of Frame index is determined by control interval Length. Value of (frame number MOD control interval) |
| } | | |
| } | | |

In this case, if several MRG messages are included in a control interval, control information is transmitted in the same format of HRG.

In Table 9, a group type indicates that system information belongs to one of the aforesaid HRG, MRG and LRG. For the example of table 9, the group type is a form of bitmap. That is, if the first bit is set to "1", it represents the HRG is transmitted in this interval. If the second bit is set to "1", it represents the MRG is transmitted in this interval. And if the third bit is set to "1", it represents the LRG is transmitted in this interval. Accordingly, "000" may represent no system information is transmitted in this interval.

However, the group type may be bit optimized by being represented as direct bit value indicating each group instead of represented as bitmap form. For example, if the system information is not transmitted or small amount of system information is transmitted because the control interval is small, it is more convenient to express each group directly using bit value of the group type filed instead of using bitmap form. If the group type indicates each group directly by the bit value of the group type, and if the number of group is 3, 2 bits may be used to identify 3 system information group (for example, 01: HRG, 10: MRG, 11: LRG).

According to one embodiment of the present invention using the bitmap type group type field, the system information group may be sequentially transmitted according to the bitmap of the group type field. For example, if the group type field has a "101" as a bitmap, system information group corresponding to the first "1" of the "101" may be first transmitted, then system information group corresponding to the second "1" of the "101" may be transmitted.

Next, in the table 9, the "configuration change count" is generally includes of 8 bits, and indicates change history of the system information. However, one embodiment of the present invention consider using the "reduced configuration change count" which includes 4 bits for bit optimization. In this case, if a configuration change count is set different per group of system information, there exists such a field per group as a reduced configuration change count.

An index type can be determined according to the number of frames within the control interval. A frame index among indexes of system information is a remainder resulting from dividing a frame number by a control interval. When the frame number is great, if this scheme is used, a low overhead is generated. A bitmap index among indexes of system information corresponds to remainders expressed in bitmap format, which result from dividing the frame number by the control interval.

In the example according to the table 9, transmitting frame index information means transmitting index of the frame through which system information is transmitted. However, the transmission unit of the system information may be a frame, a subframe or a channel transmitting subframe control information within a superframe (i.e. USCCH (Unicast Service Control Channel)). And the position information may indicates every position where the system information is transmitted, or only the position where the system information is first transmitted within the superframe. In the later case, the later transmitted system information may be detected by individual search by the mobile terminal.

For example, if one superframe includes 4 frames and the second and the fourth frame is used in transmitting the system information (that is, if 2 group is transmitted), the mobile terminal may find the first system information group at the second frame using the position information, keep searching the second (last) system information group at third frame and finally find the second (last) system information group at the fourth frame. If the second and the third frame is used in transmitting the system information within a superframe including 4 frames, the mobile terminal may find the first system information group at the second frame using the position information and find the second (last) system information group at the third frame. Because the mobile terminal finishes searching 2 system information groups, it may not try to detect the system information at the fourth frame.

If a control interval is great, several system information groups may be transmitted within a corresponding interval. Hence, it is able to transmit them in each control interval by preoccupying resources for the channel descriptor transmission control information.

On the contrary, if a control interval is small, none of system information group may be included within a corresponding interval. Therefore, a different control message is flexibly usable to enable channel descriptor transmission control information to be transmitted in a control interval for transmitting a system information group only. In this case, it is able to use a field or reserved code, which indicates whether channel descriptor transmission control information is included.

Table 10 shows an example for inserting channel descriptor transmission control information using a field indicating a presence or non-presence of the inclusion.

TABLE 10

| Syntax | Size | Notes |
|---|---|---|
| DCD_Group_included | 1 | |
| If (DCD_Group_included) { | | |
| Channel_Descriptors_Transmission_Control_Format ( ) | variable | |
| } | | |
| UCD_Group_included | 1 | |
| If (UCD_Group_included) { | | |
| Channel_Descriptors_Transmission_Control_Format ( ) | variable | |
| } | | |

Table 11 shows an example for inserting channel descriptor transmission control information using a reserved code.

TABLE 11

| Syntax | Size | notes |
|---|---|---|
| If (including DCD) { | | |
| Reserved Code 1 | 4 | |
| Channel_Descriptors_Transmission_Control_Format ( ) | variable | |
| } | | |
| If (including UCD) { | | |
| Reserved Code 2 | 4 | |
| Channel_Descriptors_Transmission_Control_Format ( ) | variable | |
| } | | |

In the following description, a system information transmitting method and a system information updating method are explained by taking UCD as an example.

Figure 9:
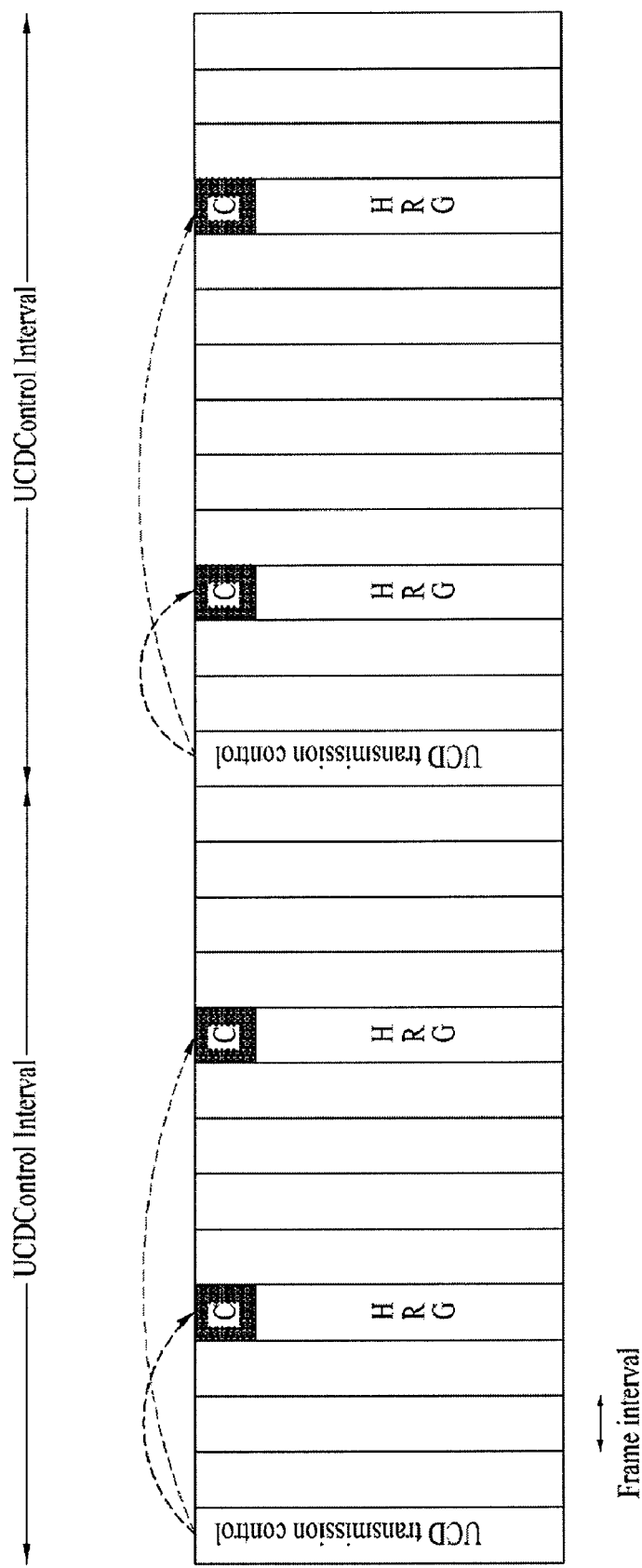
FIG. 9 is a diagram of an example for non-periodic scheduling of system information according to FIG. 8.

FIG. 9 is a diagram of an example for non-periodic scheduling of system information according to FIG. 8.

First of all, it is able to deliver information, which indicates a prescribed group is carried on a prescribed frame, to a terminal via channel descriptor transmission control information, i.e., UCD transmission control shown in FIG. 9. Therefore, it is unnecessary to fix a transmission period of HRG.

In particular, a base station transmits channel descriptor transmission control information to a terminal in advance, whereby a transmission timing point of system information can be flexibly determined. In FIG. 9, system informations of HRG are non-periodically scheduled. Whether system information of HRG is changed can be represented as a (reduced) configuration change count within UCD transmission control and a change bit indicated by 'C'. The present embodiment suppose this change bit indicates whether the system information of each group is changed using the toggling between "0" and "1". That is, the receiving side (i.e. mobile terminal) may identify any change of the system information in each group according to this toggling bit, and decides whether or not decoding of the system information of the corresponding group is need. Further description about this will be followed later.

Figure 10:
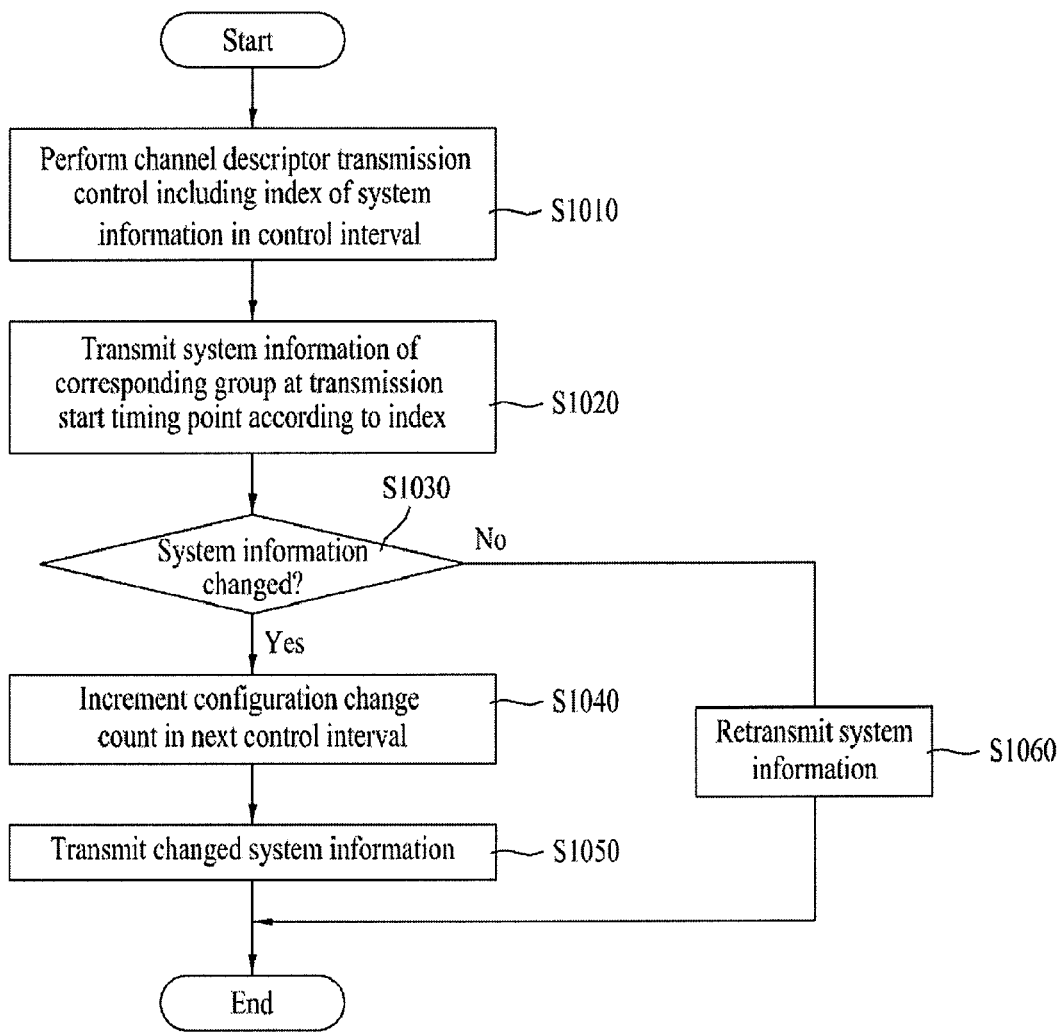
FIG. 10 is a flowchart for a system information transmitting method in case that system information is changed in FIG. 8.

FIG. 10 is a flowchart for a system information transmitting method in case that system information is changed in FIG. 8.

Referring to FIG. 10, channel descriptor transmission control information including an index of system information classified into a plurality of groups is transmitted to a terminal at a start timing point of a random control interval [S1010].

Subsequently, system information of a corresponding group is transmitted to the terminal at a transmission timing point according to the index of the system information in the control interval [S1020].

If system information of a specific group is changed in a current control interval. [S1030], a configuration change count is incremented in a next control interval [S1040]. The changed system information is then transmitted to the terminal [S1050].

In particular, a configuration change count is incremented in a next control interval, channel descriptor transmission control information including the configuration change count is transmitted to the terminal, and changed system information of a corresponding group is then transmitted at a transmission timing point according to an index included in the channel descriptor transmission control information.

Meanwhile, if system information of a specific group is not changed in a current control interval, after the channel descriptor transmission control information has been transmitted to the terminal while maintaining the configuration change count in the next control interval, system information of a corresponding group is transmitted at a transmission timing point according to the index included in the channel descriptor transmission control information [S1060].

Table 12 shows an example for channel descriptor change information on a system information group which will be actually provided in a frame carrying a system information group.

TABLE 12

| Syntax | Size | Notes |
|---|---|---|
| Group type | 2 | Group transmitted at that frame |
| (Reduced) Configuration Change Count | 8 or 4 | For Reduced Configuration Change Count: 4 LSBs of Configuration Change Count |
| Change bit | 1 | |

Maximum two information formats in Table 12 can exist in a single frame. And, the information formats shown in Table 12 are provided for DCD group and UCD group, respectively. In this case, it is impossible for a plurality of DCD or UCD groups to exist in the same frame. The information shown in Table 12 can be transmitted separate from channel descriptor transmission control information (Channel_descriptor_Transmission_Control_Format). In doing so, the channel descriptor transmission control information can be transmitted in a manner of excluding some of the fields overlapped with the channel descriptor transmission control information (Channel_descriptor_Transmission_Control_Format).

Table 13 and Table 14 show examples of downlink (DL) channel information element (IE) and uplink (UL) channel information element (IE), respectively.

TABLE 13

| Syntax | Size | notes |
|---|---|---|
| DL channel information IE { | — | — |
| Extended-2 DIUC | 4 | 0x0F |
| Length | 8 | |
| Configuration Change Count | 8 | |
| Group Type | 2 | 00: HRG<br>01: MRG<br>10: LRG |
| Encodings | variable | TLV |
| } | | |

TABLE 14

| Syntax | Size | notes |
| --- | --- | --- |
| UL channel information IE { | — | — |
| Extended-2 UIUC | 4 | 0x0D |
| Length | 8 | |
| Configuration Change Count | 8 | |
| Group Type | 2 | 00: HRG |
| | | 01: MRG |
| | | 10: LRG |
| Encodings | variable | TLV |
| } | | |

Referring to Table 13 and Table 14, three bits reserved in the previously defined downlink or uplink channel information element and seven bits in the bits for encoding are usable to indicate a configuration change count and a group type.

In case that each system information group is transmitted using DL or UL burst, a configuration change count and a group type are added in TLV format.

Figure 11:
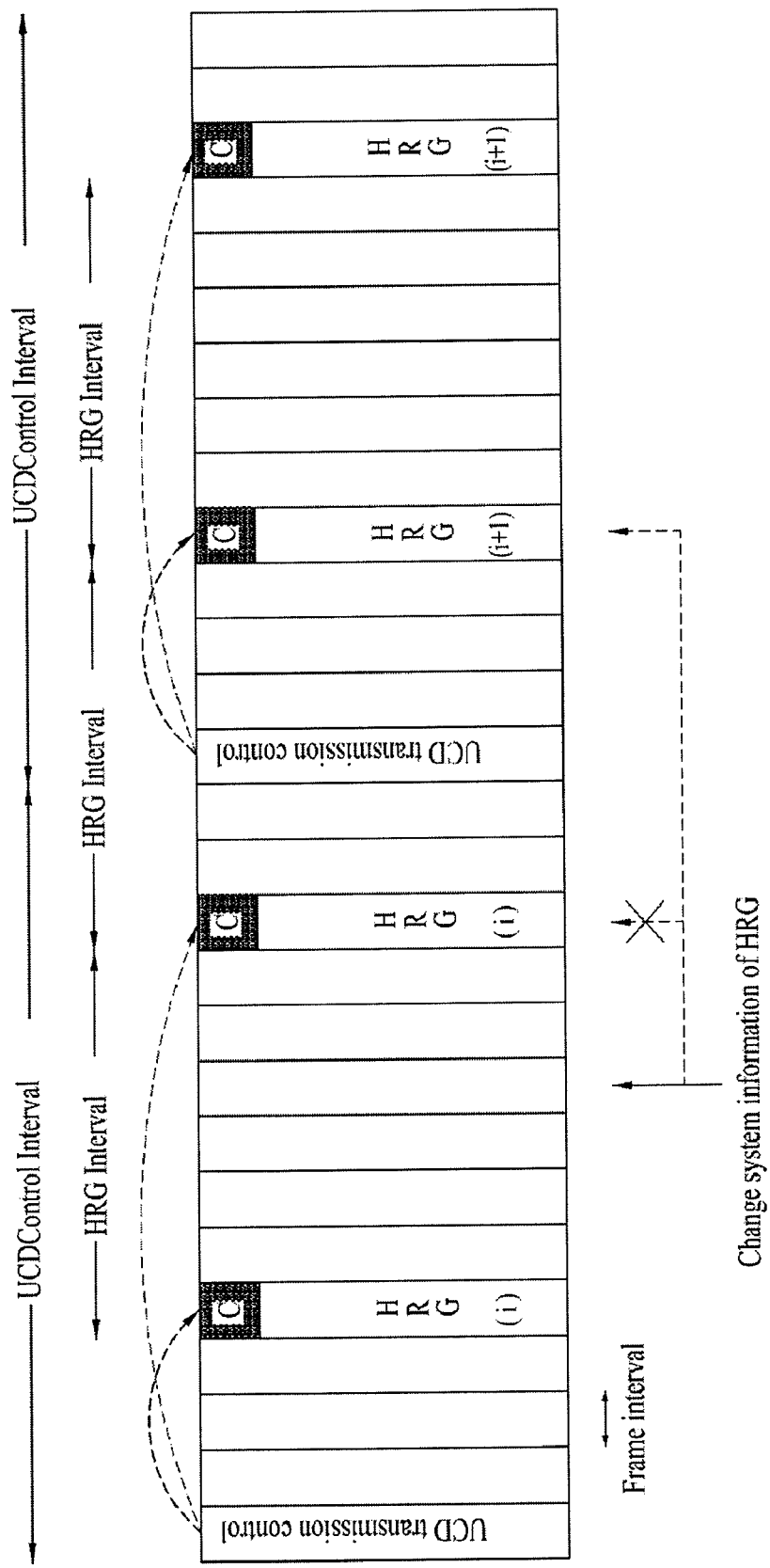
FIG. 11 is a diagram for an example that the system information changed according to FIG. 10 is reflected on scheduling.

FIG. 11 is a diagram for an example that the system information changed according to FIG. 10 is reflected on scheduling.

Referring to FIG. 11, a base station transmits UCD transmission control as channel descriptor transmission control information, and transmits the grouped system information (for example, HRG) together with configuration change count (for example (i), (i+1)) and channel descriptor change information (C).

In the example of FIG. 11, if there is a group having system information changed within a control interval (UCD control interval), the base station transmits system information of a group changed in a next control interval instead of transmitting the changed information directly reflected on a corresponding control interval. That is, even if there is a change of the system information of HRG within the first UCD control interval, the changed information of HRG is not applied until the channel configuration transmission control (for example, UCD transmission control) is transmitted.

Figure 12:
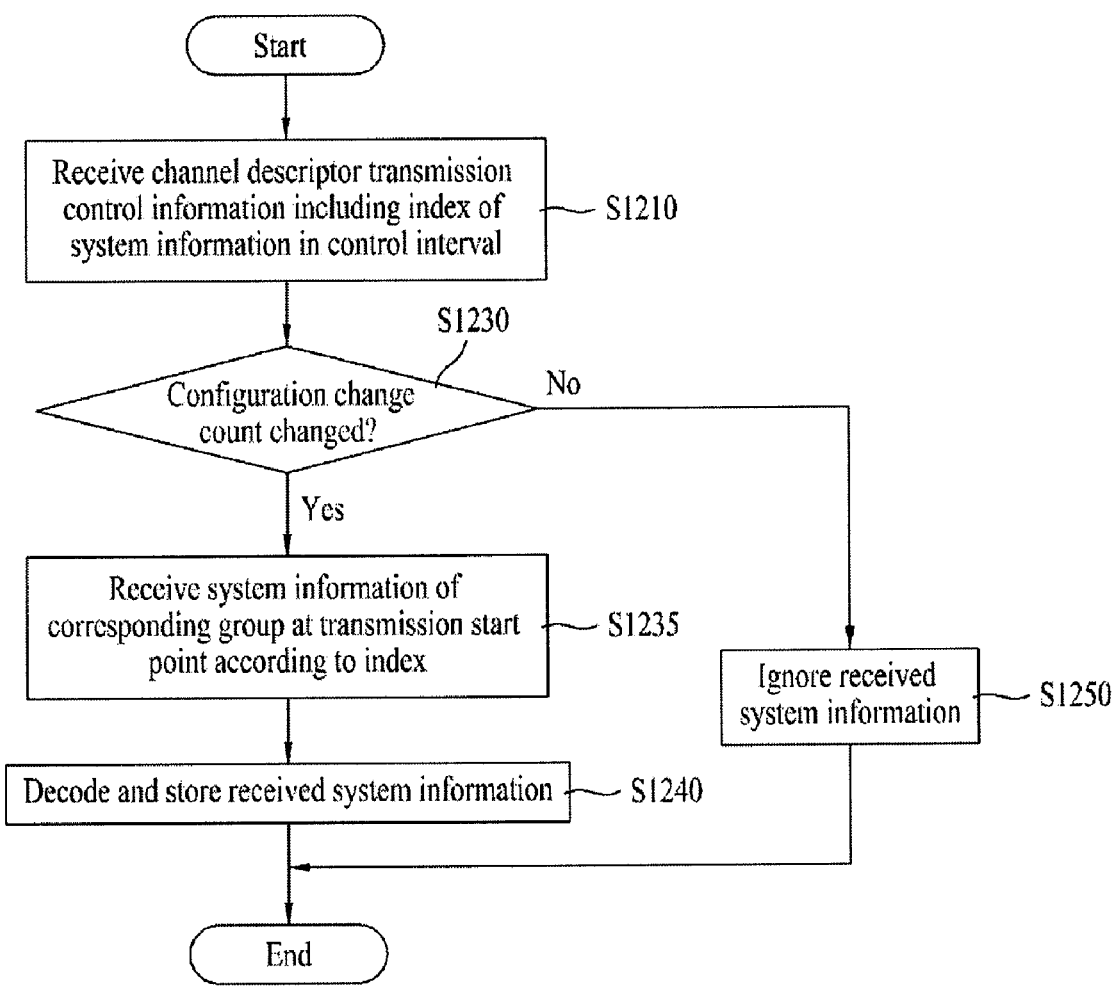
FIG. 12 is a flowchart for a system information updating method according to one embodiment of the present invention.

FIG. 12 is a flowchart for a system information updating method according to one embodiment of the present invention.

Referring to FIG. 12, channel descriptor transmission control information including an index of system information classified into a plurality of groups is received at a start timing point of an arbitrary control interval [S1210]. In this case, the channel descriptor transmission control information can include a configuration change count.

Subsequently, if the configuration change count of the channel descriptor transmission control information differs from a configuration change count stored in a terminal [S1230], system information of a corresponding group is received at a transmission timing point according to the index included in the channel descriptor transmission control information in a current control interval [S1235]. In this step S1235, the terminal is able to receive the system information of the corresponding group together with the configuration change count of the corresponding group. Subsequently, the received system information is decoded and stored [S1240]. Meanwhile, if a base station transmits channel descriptor change information to the terminal not together with the channel descriptor transmission control information, the terminal failing to read the channel descriptor transmission control information is able to perform a system information storing procedure through the channel descriptor change information.

On the other hand, if there is no difference between the received configuration change count and the configuration change count stored in the terminal, it is not necessary to decode the received system information [S1250].

In particular, when several different groups are transmitted within a control interval and the respective groups use a configuration change count in common, if a configuration change count provided to the terminal differs from a configuration change count received from the base station by 1, the terminal determines whether to store the corresponding group according to a change bit value. The present embodiment suppose that the change bit is represented by toggling between "0" and "1". Since the change bit indicates a presence or non-presence of a change with a right previous configuration change count only, if a configuration change count provided to the terminal differs from a configuration change count received from the base station by 2 or higher, the terminal updates system information of all groups. On the contrary, if a configuration change count provided to the terminal is equal to a configuration change count received from the base station, the terminal may not perform the decoding and storage of all system informations within a corresponding control interval.

Accordingly, the terminal needs not to decode DCD or UCD group message each time to check a presence or non-presence of a system information group. Using the channel descriptor transmission control information and the channel descriptor change information, the terminal decodes system information of a changed group if the system information is changed. As the terminal stores and updates the group to which the changed system information belongs only, the terminal is able to reduce a memory for the storage and a process for updating each field. And, the terminal is also able to improve an updating speed.

Figure 13:
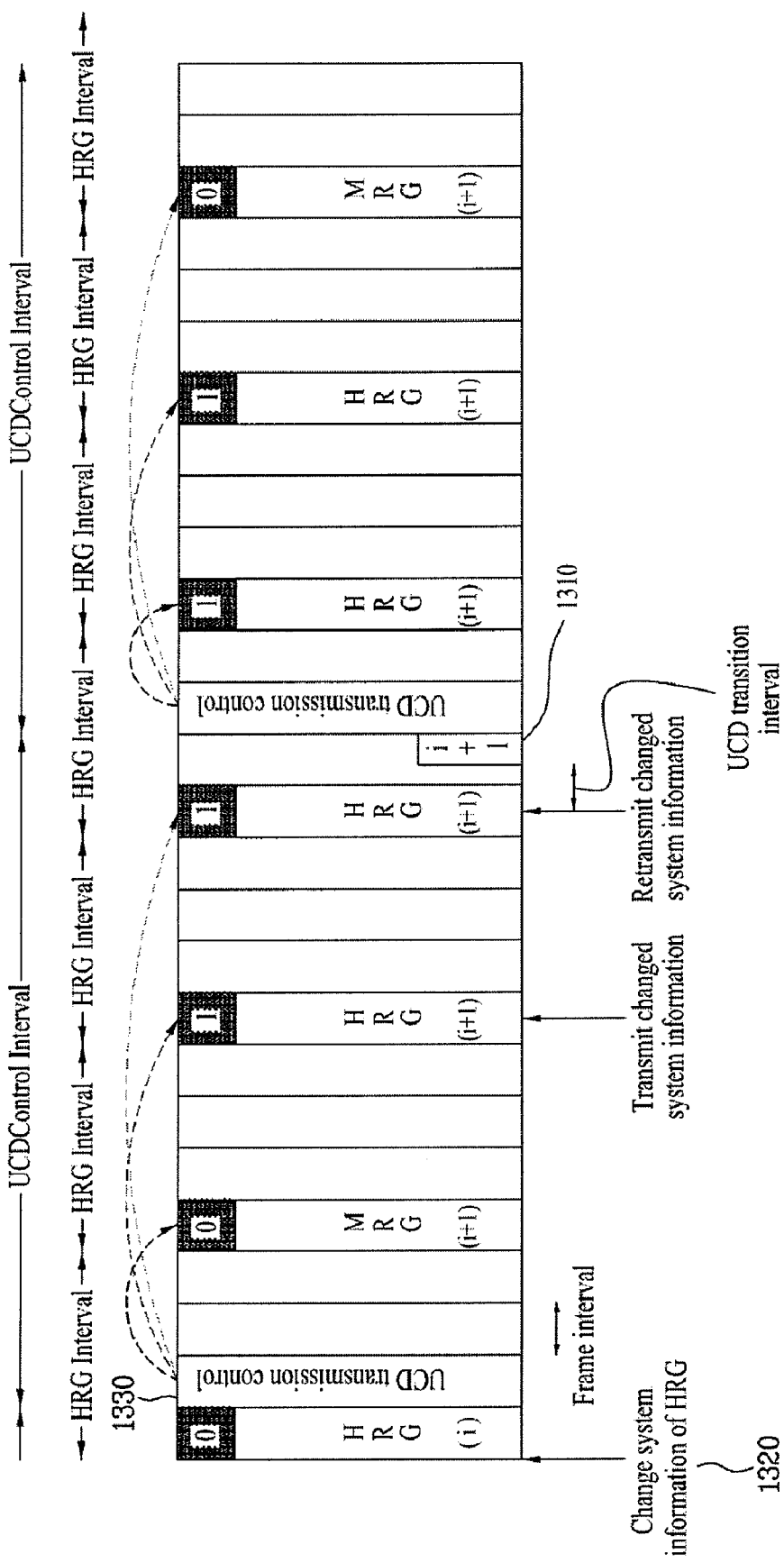
FIG. 13 is a diagram for an example of scheduling of system information of a high repetition group according to one embodiment of the present invention.

FIG. 13 is a diagram for an example of scheduling of system information of a high repetition group according to one embodiment of the present invention.

FIG. 13 shows an example for updating $UCD_{HRG}$ belonging to HRG in a terminal. After change event of the system information of HRG is occurred (1320), the subsequent UCD transmission control (1330) may transmit configuration change count and change bit of 1 MRG and 2 HRGs applied this change event. That is, if the configuration change count before the change event (1320) is (i) and the change bits for the HRG, MRG and LRG is "0", the configuration change count of the UCD transmission control (1330) which is common to the all system information group is transmitted as (i+1). And, change bit of the HRG among 3 change bits is toggled to be "1".

However, the mobile terminal apply this change after receiving MAP message as explained above. That is, in case of receiving MAP message 1310 having a count equal to a current configuration change count, the terminal updates current system information.

Figure 14:
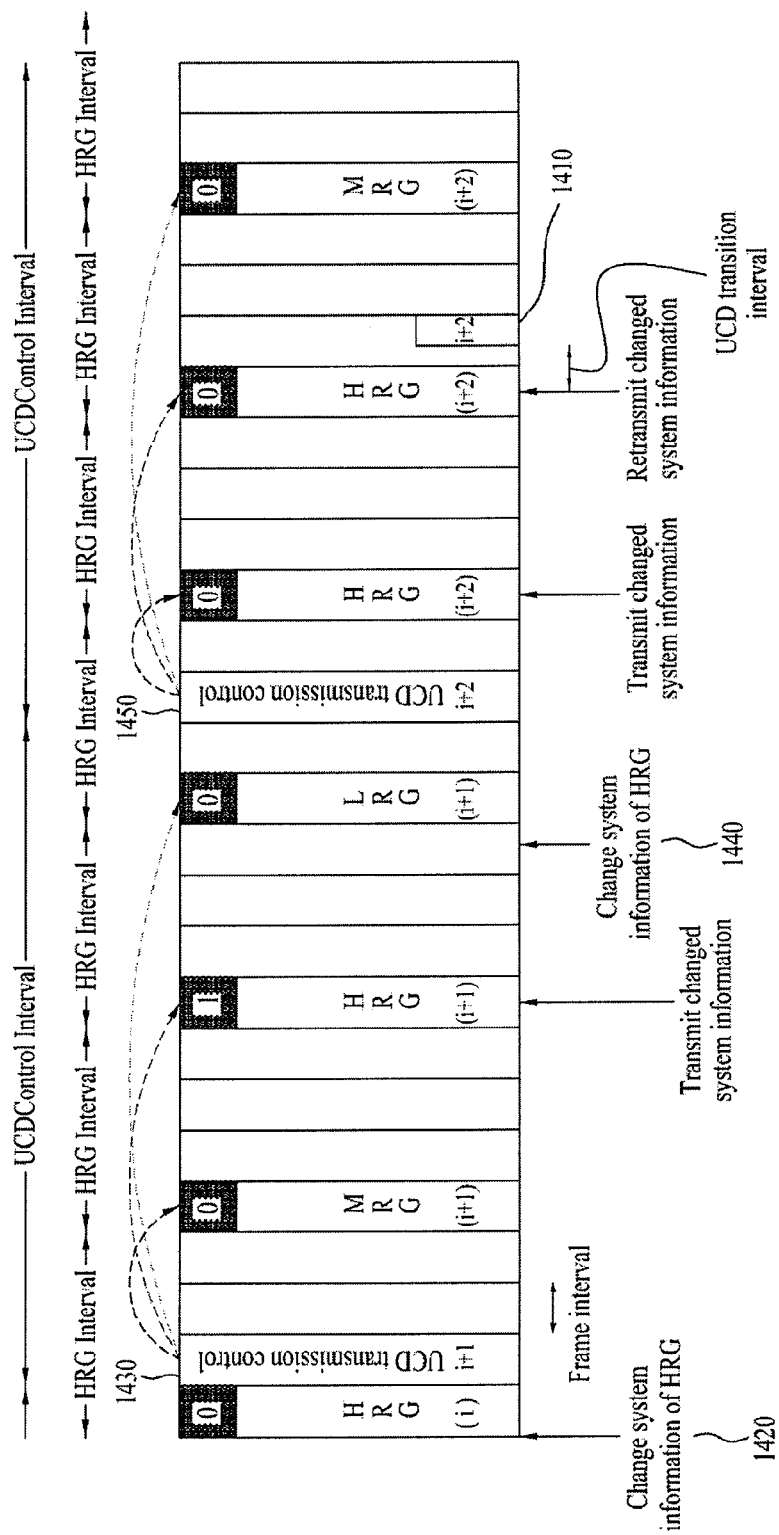
FIG. 14 is a diagram for an example of scheduling of system information of a high repetition group according to one embodiment of the present invention in case that the system information is changed within a current control interval.

FIG. 14 is a diagram for an example of scheduling of system information of a high repetition group according to one embodiment of the present invention in case that the system information is changed within a current control interval.

FIG. 14 shows an example that a terminal updates system information if information of a same group is changed, while there is no resource scheduled for retransmitting changed $UCD_{HRG}$ within a current UCD control interval.

In more detail, after the change event (1420) of the system information of HRG, the subsequent UCD transmission control (1430) may transmit configuration change count as (i+1) and the change bit of HRG as "1". And additional change event of the HRG system information (1440) may occur before MAP message indicating the apply of the changed system information is received. In this case, the subsequent UCD transmission control (1450) may transmit the configuration change count as (i+2) and the change bit of the HRG as "0" which toggled back. Finally, when the MAP message having configuration change count of (i+2) is received, the mobile terminal may apply these two changes at one time.

That is, in case of receiving MAP message 1410 having a count equal to a current configuration change count, the terminal updates current system information.

As shown in the example of FIG. 14, if the configuration change count of the channel descriptor transmission control has a different value more than 2, it is better for the mobile terminal to decode every group of system information since it is difficult to find out which group of the system information is changed.

Figure 15:
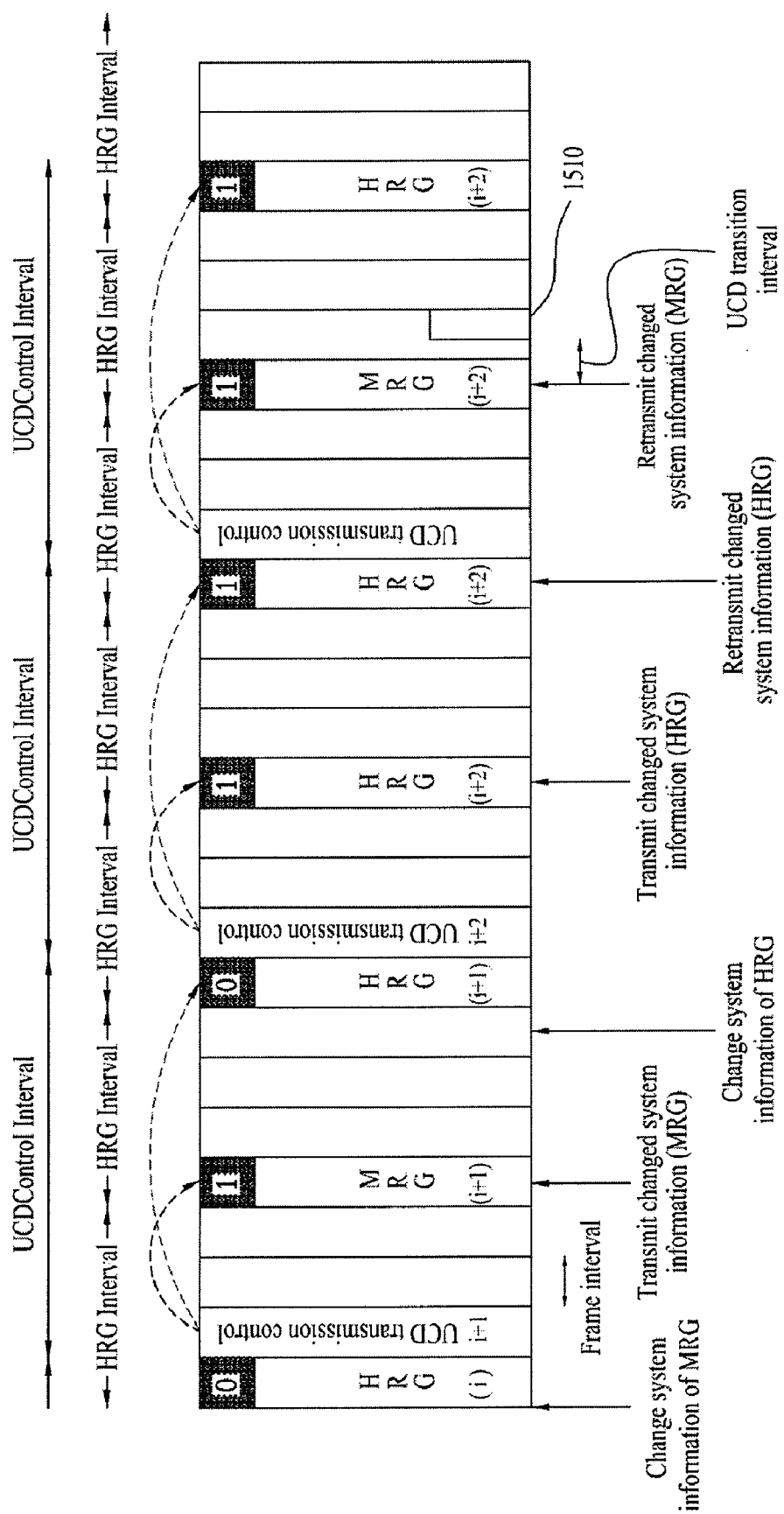
FIG. 15 is a diagram for an example of scheduling of system informations of high and middle repetition groups according to one embodiment of the present invention in case that the system information is changed within a current control interval.

FIG. 15 is a diagram for an example of scheduling of system informations of high and middle repetition groups according to one embodiment of the present invention in case that the system information is changed within a current control interval.

Referring to FIG. 15, a control interval is shorter than that of FIG. 14. Therefore, while $UCD_{MRG}$ belonging to MRG is changed and transmitted, $UCD_{HRG}$ having a short period is changed and then completely retransmitted. In FIG. 15, (i), (i+1), (i+2) and the like indicate configuration change counts, respectively. In this case, a terminal updates system information by considering another group in a retransmission pending status. In particular, an update of $UCD_{HRG}$ is performed after completion of the retransmission of $UCD_{MRG}$ and the UCD transition interval. Finally, in case of receiving MAP message 1510 having a count equal to a current configuration change count, the terminal updates current system information.

Figure 16:
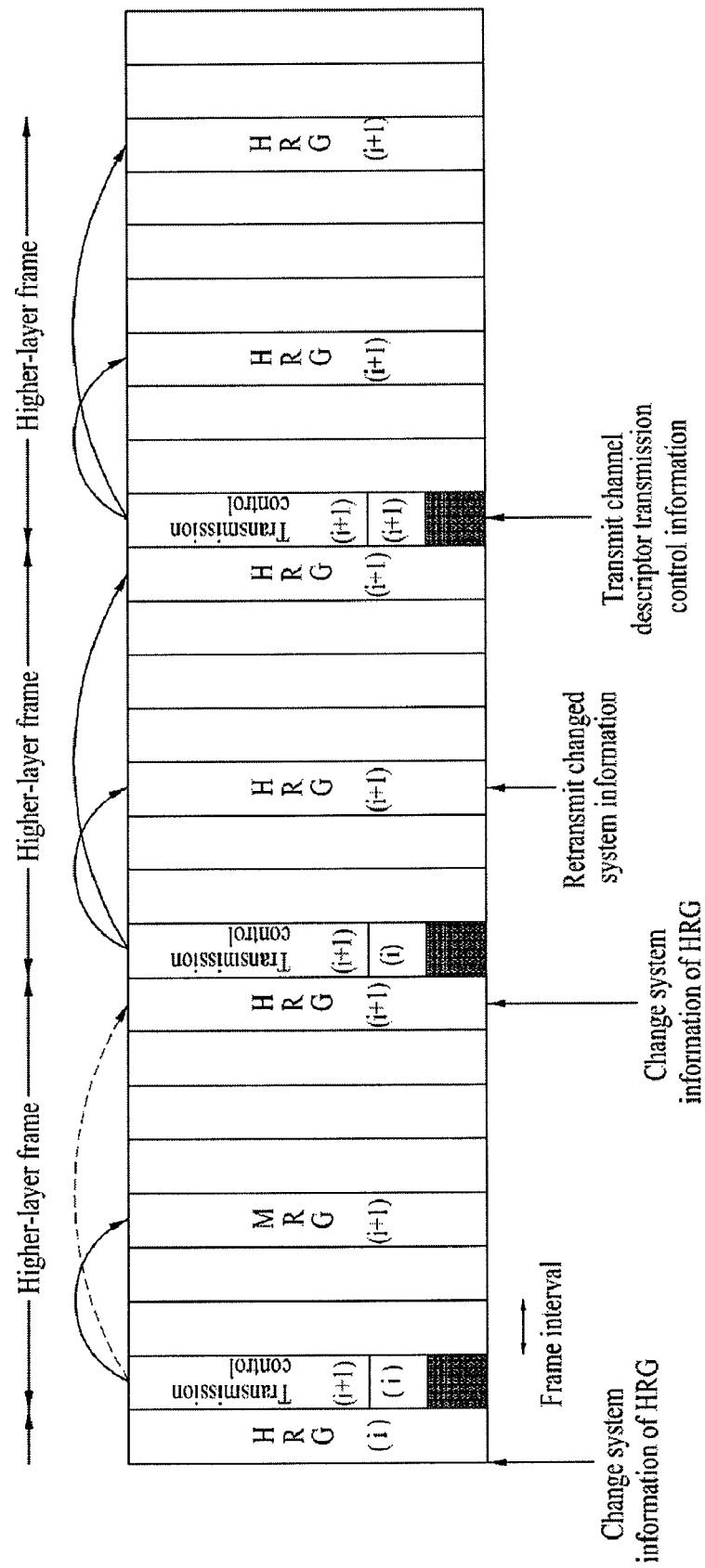
FIG. 16 is a diagram for an example of scheduling of system information of a high repetition group according to one embodiment of the present invention in a higher layer frame structure.

FIG. 16 is a diagram for an example of scheduling of system information of a high repetition group according to one embodiment of the present invention in a higher layer frame structure.

In the next generation communication system, the superframe is introduced and used to more effectively transmit control information. One superframe may include 4 frames, and each frame may include 8 subframe. Using this hierarchical structure, the method for transmitting system information in the unit of higher layer frame which corresponds to the superframe will be explained.

Referring to FIG. 16, the transmissions of channel descriptor transmission control information and system information in a higher-layer frame structure are performed in a manner similar to that explained in the foregoing description. In this example, channel descriptor transmission control information is transmitted to a terminal only without transmitting channel descriptor change information, i.e., a change bit to the terminal.

In this case, the channel descriptor transmission control information is included in a format for transmitting control information of a higher-layer frame. Namely, a control interval becomes a higher-layer frame unit.

Instead of transmitting DCD or UCD count within a MAP message each frame, the DCD or UCD count is transmitted by a higher-layer frame unit. Hence, an update unit of system information becomes a higher-layer frame unit. Accordingly, it is able to reduce overhead generated from transmitting DCD or UCD count each frame. In particular, a UCD count (or DCD count) 'i' up to a second higher-layer frame is incremented into 'i+1' in a third higher-layer frame. And, a terminal updates current system information.

The above-explained embodiments relate to a scheme for managing and updating all groups of DCD or UCD using a single configuration change count. Besides this scheme, the present invention is able to manage a version of system information per group by giving a configuration change count to each group. And, a terminal is able to individually perform an update of system information per group. A scheme of using an individual count is more efficient and flexible in aspect of system information update. In this case, a MAP message transmitted by including a configuration change count, a neighbor base station advertisement (MOB-NBR-ADV) message or the like carries a configuration change count of each group according to a function of the corresponding message. For instance, as the neighbor base station advertisement message is the message carrying information on a neighbor base station, it includes all configuration change counts of groups per neighbor base station. Hence, as the number of neighbor base stations is incremented, so does the number of transmitted configuration change counts. Moreover, it is able to determine whether to handle a configuration change count as a per-group field or a common field in a channel descriptor transmission control information format, according to whether a configuration change count is given to each group.

Figure 17:
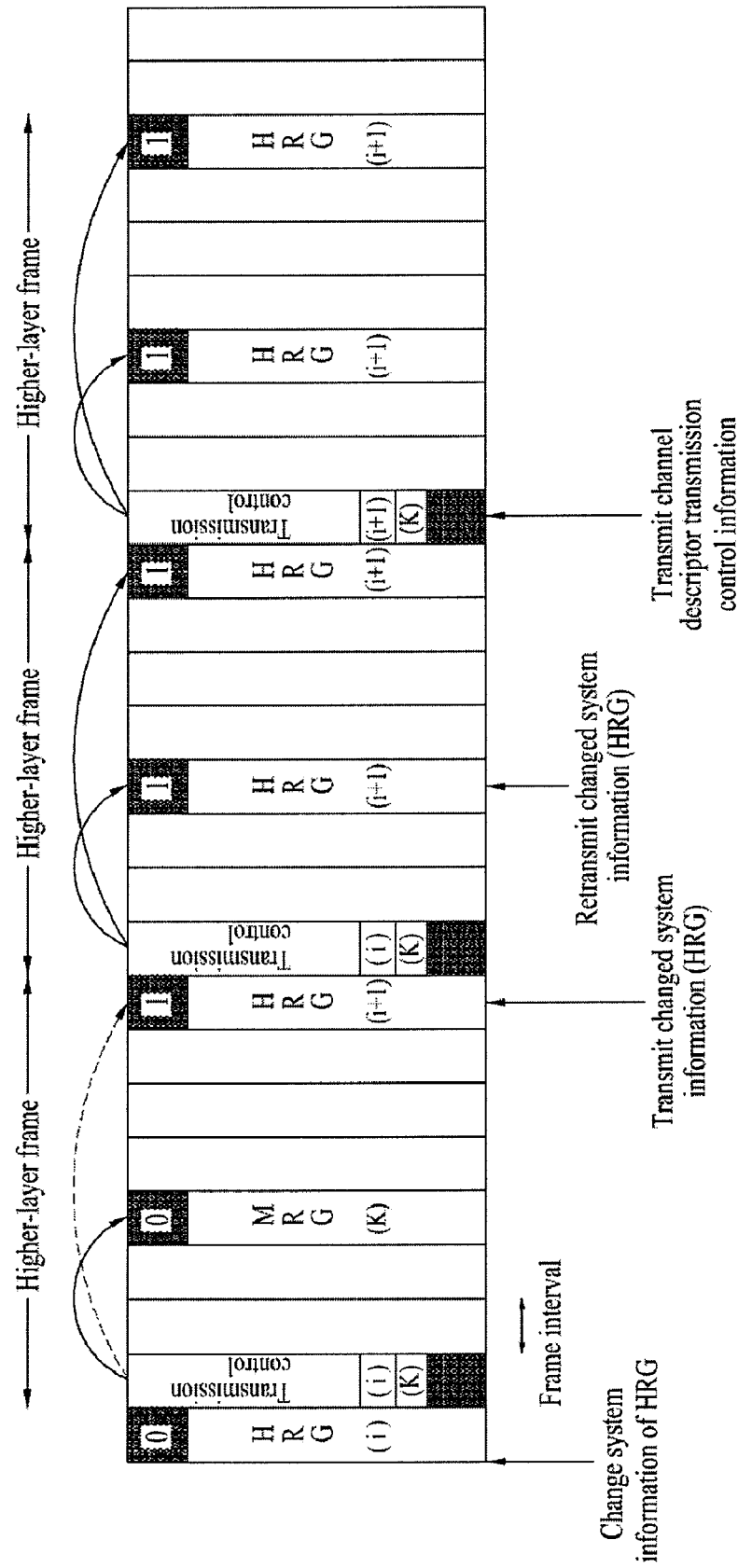
FIG. 17 is a diagram for an example of scheduling of system information of a high repetition group according to another embodiment of the present invention in case that each group in a higher layer frame structure has an independent configuration change count.

FIG. 17 is a diagram for an example of scheduling of system information of a high repetition group according to another embodiment of the present invention in case that each group in a higher layer frame structure has an independent configuration change count.

Referring to FIG. 17, channel descriptor change information is not transmitted but channel descriptor transmission control information is transmitted. In this case, the digit '0' or '1' at the top of HRG or MRG indicates a change bit and is carried on channel descriptor transmission control information only. For clarity and convenience, the digit is displayed on system information of a corresponding group.

As mentioned in the foregoing description, a terminal compares a per-group change bit carried on channel descriptor transmission control information to a per-group change bit value provided to the terminal. In this case, if there is a group having a value of a change bit different from that carried on the channel descriptor transmission control information, the terminal is able to know that system information of the corresponding group is changed and transmitted. A configuration change count of HRG, a configuration change count of MRG or the like is called a per-group configuration change count.

For instance, in FIG. 17, a configuration change count of HRG, which is initially provided to the terminal, and a count of DCD or UCD correspond to 'i' and a change bit of HRG is '0'. A configuration change count of MRG and a count of DCD or UCD correspond to 'k' and a change bit of MRG is '0'.

If system information of a specific group is changed, a corresponding per-group configuration change count is incremented only. The incremented per-group configuration change count is transmitted to the terminal together with the changed system information.

A change bit of HRG in a first transmission control located in a left part is '1'. A change bit of MRG indicates '0'. And, DCD and UCD counts of the first transmission control correspond to 'i' and 'k', as they were, respectively. Therefore, the terminal recognizes that HRG has changed and then decodes and stores the corresponding changed group (HRG) only. Subsequently, the base station retransmits the changed HRG in pre-scheduled order. Meanwhile, a count of DCD or UCD in a transmission control interval of a third higher-layer frame is incremented into (i+1) and the terminal updates current system information.

Following is a method for transmitting system information using PBCH (Primary Broadcast Channel), SBCH (Secondary Broadcast Channel) and the like within the superframe based on the grouping.

As mentioned above, the superframe may include 4 frames and each frame may include 8 subframes. The super frame header may include PBCH and SBCH.

It is supposed that the PCBH is transmitted in every superframes. The base station may transmit transmission control information and current change count (DCD/UCD count) thorough this PBCH. In this embodiment using superframe structure, the change of the system information may be applied in the very moment the event occurs. In this case, the configuration change count may serve as a apply count.

ON the other hand, the SBCH may be transmitted per 1 or more superframes. Through this SBCH, each of the system information grouped according to any embodiment of the present invention may be transmitted.

Using this structure, the PBCH may serve as channel descriptor transmission control information as shown in the table 9. However, if the SBCH is transmitted through the known position, for example, if the SBCH is transmitted in the same frame in which the PCBH is transmitted, any frame index for indicating the position where the system information is transmitted may not needed.

Possible example of the PCBH is as follows.

TABLE 15

| Syntax | Size (bit) | Notes |
|---|---|---|
| PBCH_message( ) { | | |
| Super frame number | 22 | |
| Group Type | 3 | 000: no transmission<br>001: HRG<br>010: MRG<br>100: LRG |
| Change count (common) | 8 | |
| Change toggle bitmap | 3 | For HRG, MRG and LRG |
| } | | |

In the table 15, the group type is expressed as a bitmap type, however, the value of the group type may directly indicates each of the system information group as discussed earlier. And the table 15 shows an example of using change count having 8-bit-length and change bit (c) expressed as toggling bit for the change of each system information group. Embodiments of the present invention for transmitting system information using the superframe structure will be explained.

Figure 18:
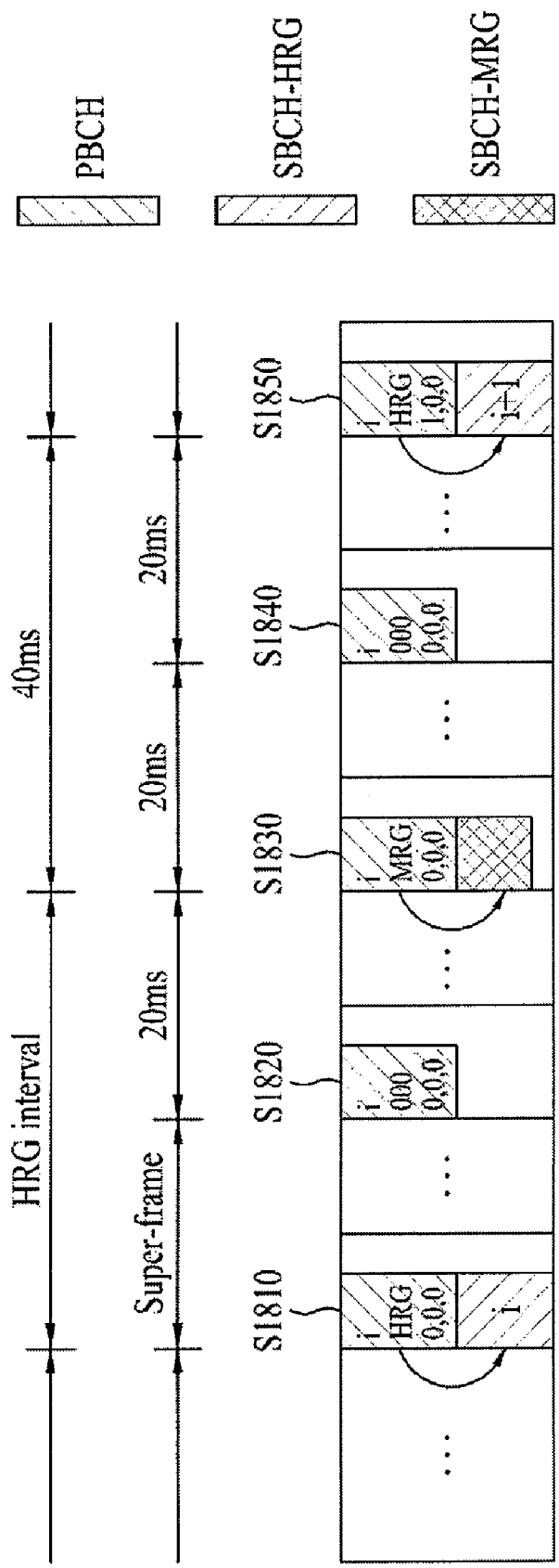
FIG. 18 shows an example of having one configuration change count for all group and the changed system information is simultaneously applied in the frame where the change occurs.

FIG. 18 shows an example of having one configuration change count for all group and the changed system information is simultaneously applied in the frame where the change occurs.

In the FIG. 18, HRG interval is set to 40 ms, the length of the superframe is 20 ms. As discussed above, PBCH is transmitted in every superframes. And the SBCH including the system information of the corresponding group is transmitted per every 2 superframe.

At S1810, PBCH having configuration change count of "i" and information for the transmission of SBCH, in which HRG is transmitted, is transmitted. The change bits (or change toggle bitmap) is set to 0, 0, 0, thus indicates that the initial change bit of HRG, MRG and LRG is "0". At this step, the SBCH having HRG is transmitted through the same frame in which the PBCH is transmitted. The SBCH has the configuration change count of "I".

At S1820, the PBCH having group type filed of "000" is transmitted. This indicates that no system information is transmitted within this control interval.

At S1830, the PBCH having the configuration change count of "i" and the information for transmitting of the SBCH, through which the MRG is transmitted, is transmitted. The change toggle bitmap remains as "0, 0, 0" since until now there is no system information change. As shown in the FIG. 18, the SBCH transmitting MRG is transmitted in the same frame as the PBCH.

At S1840, the PBCH has group type of "000", thus there is no system information transmission in this control interval.

S1850 shows the case when the HRG change occurs. As stated above, this embodiment supposes that any system information change is applied at the moment when it occurs. Thus, the configuration change count of the PBCH transmitted at S1850 has "i+1", the toggle bitmap has "1, 0, 0" such that it indicates the change of the HRG. And SBCH transmitting HRG has configuration change count of i+1 may be applied at this moment.

In the FIG. 18, the configuration change count is common to all groups. However, the configuration change count may be separately indicates the change of the each group.

Figure 19:
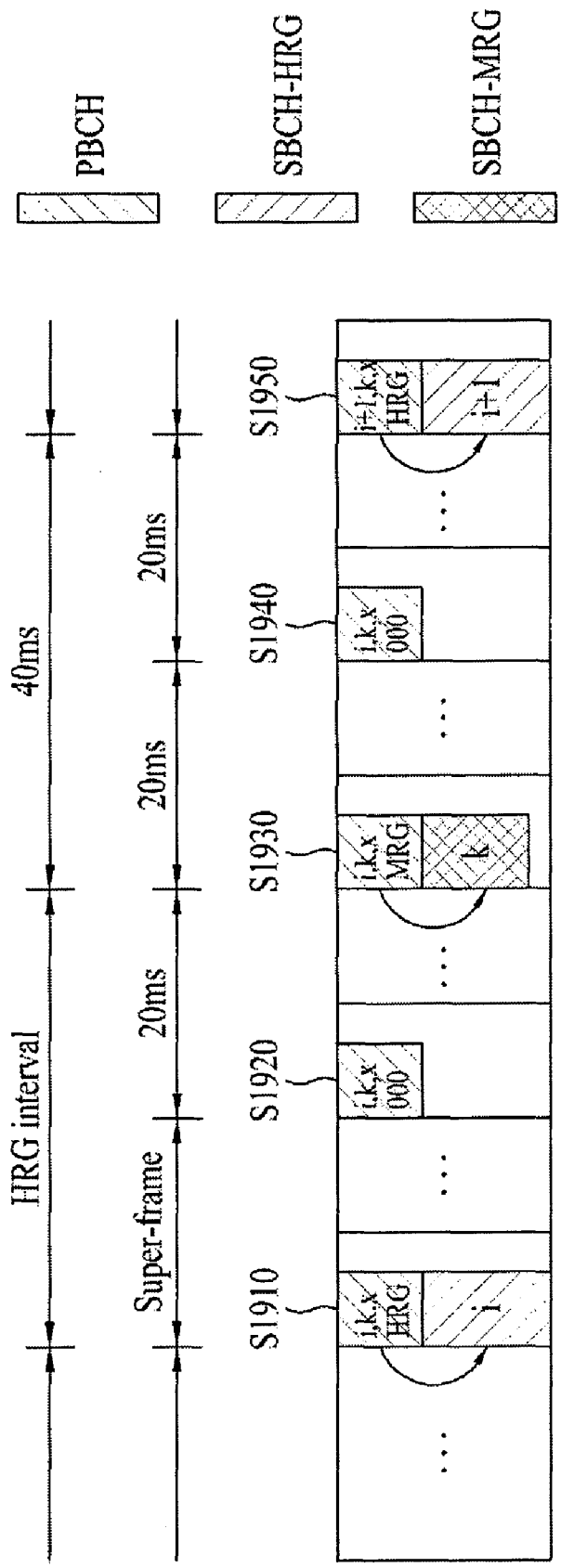
FIG. 19 shows an example of having individual configuration change count for each group and the change of the system information being applied at the moment the change occurs.

FIG. 19 shows an example of having individual configuration change count for each group and the change of the system information being applied at the moment the change occurs.

In the FIG. 19, HRG interval and the length of the superframe are same to the FIG. 18. The configuration change counts corresponding to HRG, MRG and LRG, respectively is expressed as the form of "i, k, x". Thus the change toggle bitmap may not be needed.

The general operation of S1910 through S1950 is similar to those of FIG. 18 except that the configuration change count is individually applied for each group. At S1950, when there is a change of HRG, the configuration change count corresponding to HRG is changed to "i+1" while the configuration change counts corresponding to MRG and LRG are remained as k, x, respectively. And also the FIG. 19 shows an example of applying any change of the system information at the moment the change occurs.

In addition, there may be system information which can not be transmitted through PBCH or SBCH (for example, neighboring BS information, paging information, and so on). On embodiment of the present invention propose that transmitting this additional information through other frame than the frame where the PCBH and/or SBCH is transmitted.

Figure 20:
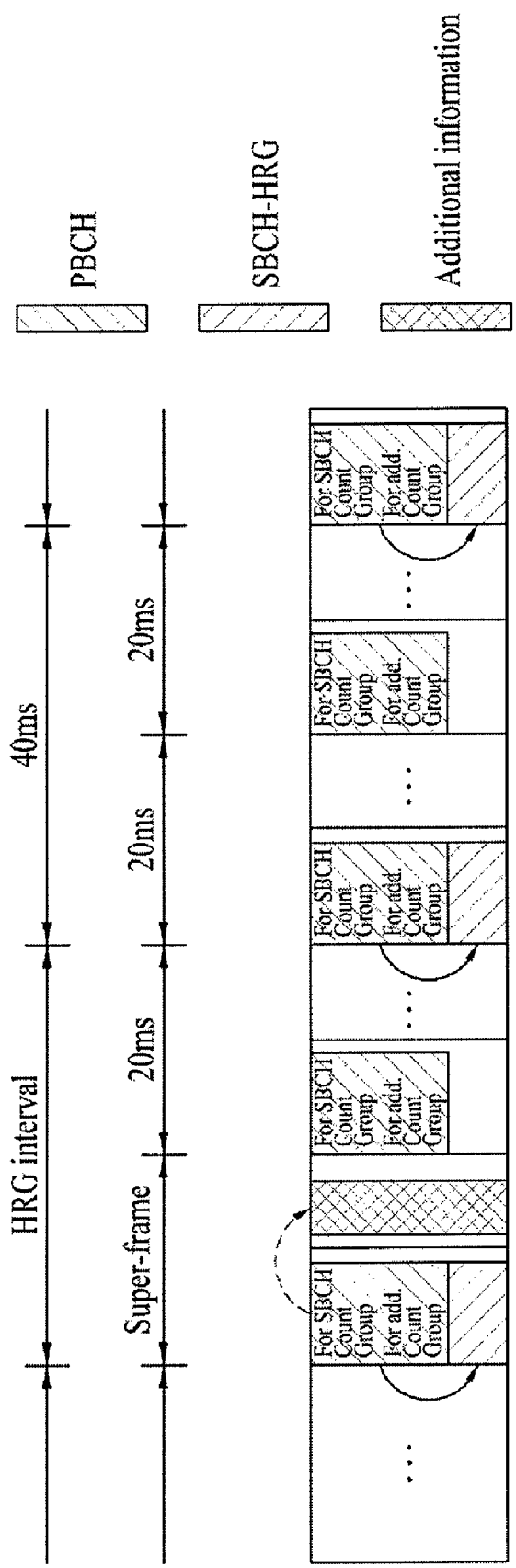
FIG. 20 shows an example of transmitting control information about transmission of the additional information which can not transmitted through PBCH and/or SBCH.

FIG. 20 shows an example of transmitting control information about transmission of the additional information which can not transmitted through PBCH and/or SBCH.

The HRG interval length and the superframe length are same to the FIGS. 18 and 19. However the FIG. 20 show that the PBCH additionally has control information about the transmission of the additional information which can not transmitted through PCBH and SBCH.

In the example of FIG. 20, control information about the transmission of SBCH may have similar form as the examples shown in FIGS. 18 and 19. And control information about the transmission of the additional information may have a similar form as that of transmission of SBCH. However, since the additional information is transmitted through different frame comparing to the PBCH and SBCH, the PBCH may have frame position information where the additional information is transmitted.

In another embodiment of the present invention, the control information for the transmission of the additional information may not have the configuration change count and count bit. Since the additional information is not generated frequently, so if the additional information is needed to be transmitted, it is preferred that the mobile station decodes all this additional information. By not having configuration change count and count bit in the control information for the additional information, the signaling overhead may be reduced.

Figure 21:
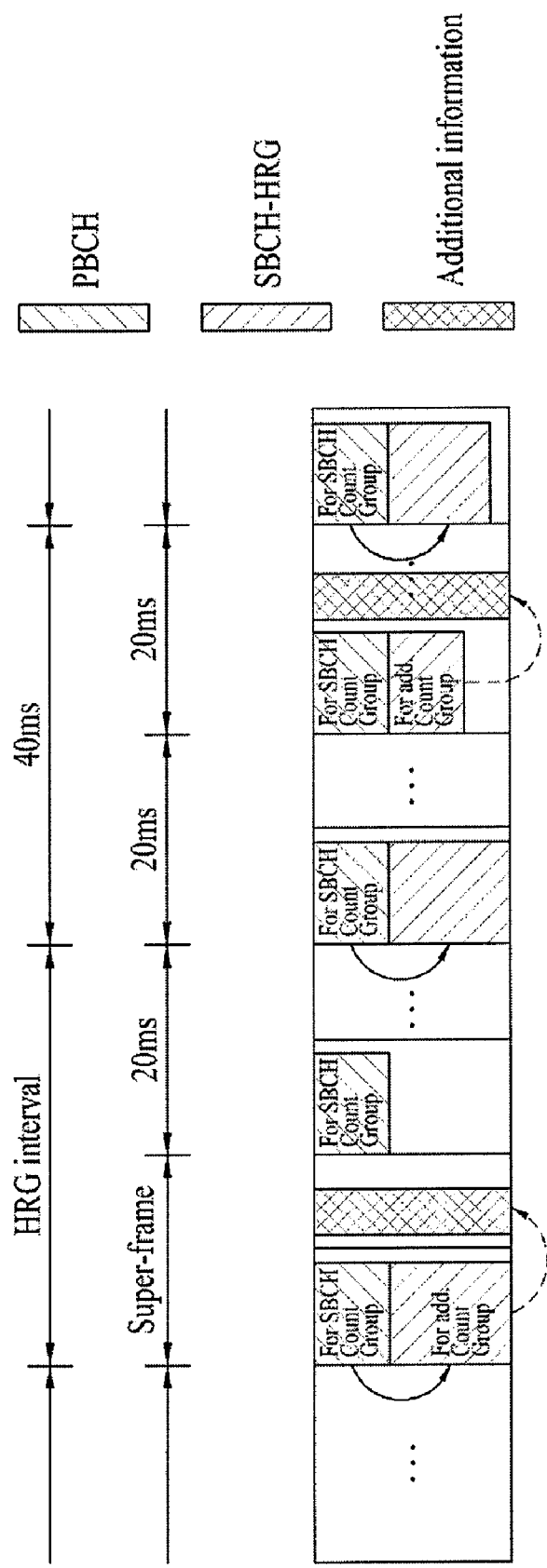
FIG. 21 shows an example of transmitting control information for the additional information through SBCH.

FIG. 21 shows an example of transmitting control information for the additional information through SBCH.

As in FIG. 20, additional system information which can not transmitted through PCBH and SBCH is transmitted through different frame from those for PBCH and SBCH. And in the example of FIG. 21 the SBCH, not the PBCH, has the control information for additional information transmission.

As stated above, the system information may be transmitted in the unit of frame, subframe or USCCH. And the transmission position information for this system information may include all the position where the system information is transmitted or the first position information within the superframe.

In the above embodiments, the system information is grouped as HRG, MRG and LRG according to the frequency of transmission. However, the system information may be grouped into a different number of groups, using different criteria. For example, in the case of transmitting the system information using SBCH, each group may be identified as sub-SBCH.

One embodiment of grouping the system information into 6 sub-SBCHs will be explained. In this case, the PBCH having the transmission control information about these 6 sub-SBCHs may be expressed as follows.

TABLE 16

| Syntax | Size (bit) | Notes |
|---|---|---|
| PBCH_message( ) { | | |
|     Super frame number | 22 | |
|     Sub-SBCH scheduling information | 6 | sub-SBCH1~6 |
|     Change count (common) | 8 | |
|         Change toggle bitmap | 4 | sub-SBCH1~4 |
| } | | |

In the table 16, the PBCH includes "sub-SBCH scheduling information" corresponding to the "group type" in the table 9. The sub-SBCH scheduling information may indicate the transmitted sub-SBCH. And, in the table 16, the change toggle bitmap indicates the change information about the sub-SBCHs 1-4. The system information transmitted through SBCH in the FIG. 21 corresponds to the sub-SBCHs 1-4 and the additional information in the FIG. 21 corresponds to the sub-SBCHs 5-6.

Each of the sub-SBCH may include necessary parameters for basic configuration for transmission, bandwidth request and ranging related parameter, DL/UL resource configuration, UL FFR and power control configuration related parameter and transmission control information for the additional information.

Among these, an exemplary format for the transmission control of the additional information is as follows.

TABLE 17

| Syntax | Size (bit) | Notes |
|---|---|---|
| sub-SBCH6_message( ) { | | |
|     Additional scheduling information | TBD | bitmap |
|     Start position | TBD | |
| } | | |

The present invention relates to a method for a base station to broadcast system information in a wireless access system and a method for a terminal to update system information therein and is applicable to such a wireless access device supporting IEEE 802.16e, IEEE 802.16m and the like as a base station, a terminal and the like.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method for transmitting system information in a wireless access system, the method comprising:

transmitting primary control information comprising group type information of the system information to indicate which group type is included in a subsequently transmitted secondary control information, wherein the system information is categorized into a plurality of groups, a system configuration change count and a bitmap for indicating change for each of the plurality of groups to a terminal at a start timing point of a superframe; and transmitting the secondary control information comprising the system information categorized into the group type indicated by the group type information, wherein the system configuration change count is commonly applied to all of the plurality of groups, and wherein each bit of the bitmap indicates the changing status of the corresponding group in association with the system configuration change count.

2. The method of claim 1, wherein the primary control information is transmitted through a PBCH (Primary Broadcast Channel) and the secondary control information is transmitted through a SBCH (Secondary Broadcast Channel).

3. The method of claim 1, wherein the system information of each group of the plurality of groups is transmitted in different timing and periodicity.

4. The method of claim 1, wherein the group type information indicates only one group of the plurality of groups.

5. A method for receiving system information by a mobile terminal in a communication system, the method comprising:

receiving primary control information comprising group type information of the system information to indicate which group type is included in a subsequently transmitted secondary control information, wherein the system information is categorized into a plurality of groups, a system configuration change count and a bitmap for indicating change for each of the plurality of groups from a base station at a start timing point of a superframe;

comparing the received system configuration change count and a last stored system configuration change count; and determining not to decode a subsequently received secondary control information comprising the system information categorized into the group type indicated by the group type information, if there is no difference between the received system configuration change count and the last stored system configuration change count, wherein the system configuration change count is commonly applied to all of the plurality of groups, and wherein each bit of the bitmap indicates the changing status of the corresponding group in association with the system configuration change count.

6. The method of claim 5, wherein the primary control information is transmitted through a PBCH (Primary Broadcast Channel), and the secondary control information is transmitted through a SBCH (Secondary Broadcast Channel).

7. The method of claim 5, wherein the system information of each group of the plurality of groups is transmitted in different timing and periodicity.

8. The method of claim 5, wherein the group type information indicates only one group of the plurality of groups.

9. A base station for transmitting system information in a wireless access system, the base station comprising:

a processor; and a radio frequency (RF) module transmitting and receiving a radio signal to and from the outside under the control of the processor, wherein the processor controls primary control information comprising group type information of the system information to indicate which group type is included in a subsequently transmitted secondary control information, wherein the system information is categorized into a plurality of groups, a system configuration change count and a bitmap for indicating change for each of the plurality of groups to a terminal to be broadcast at a start timing point of a superframe, and wherein the processor controls the secondary control information comprising the system information categorized into the group type indicated by the group type information to be broadcast, wherein the system configuration change count is commonly applied to all of the plurality of groups, and wherein each bit of the bitmap indicates the changing status of the corresponding group in association with the system configuration change count.

10. The base station of claim 9, wherein the processor further controls the system information of each group of the plurality of groups to be transmitted in different timing and periodicity, and wherein the group type information indicates only one group of the plurality of groups.

11. The base station of claim 9, wherein the primary control information is transmitted through a PBCH (Primary Broadcast Channel), and the secondary control information is transmitted through a SBCH (Secondary Broadcast Channel).

12. A mobile station for receiving system information of a base station in a wireless access system, the mobile station comprising:

a processor; and a radio frequency (RF) module transmitting and receiving a radio signal to and from the outside under the control of the processor, wherein the processor controls primary control information comprising group type information of the system information to indicate which group type is included in a subsequently transmitted secondary control information, wherein the system information is categorized into a plurality of groups, a system configuration change count and a bitmap for indicating change for each of the plurality of groups to a terminal to be received from the base station at a start timing point of a superframe, wherein the processor then compares the received system configuration change count and a last stored system configuration change count, and determines not to decode a subsequently received system information categorized into the group type indicated by the group type information in the secondary control information if there is no difference between the received system configuration change count and the last stored system configuration change count, wherein the system configuration change count is commonly applied to all of the plurality of groups, and wherein each bit of the bitmap indicates the changing status of the corresponding group in association with the system configuration change count.

13. The mobile station of claim 12, wherein the system information of each group of the plurality of groups is received in different timing and periodicity, and wherein the group type information indicates only one group of the plurality of groups.

14. The mobile station of claim 12, wherein the primary control information is transmitted through a PBCH (Primary Broadcast Channel), and the secondary control information is transmitted through a SBCH (Secondary Broadcast Channel).

* * * * *